(12) United States Patent
Rehm et al.

(10) Patent No.: US 7,210,996 B2
(45) Date of Patent: May 1, 2007

(54) QUESTIONNAIRE METHOD OF MAKING TOPIC-SPECIFIC WORD PUZZLE DOCUMENTS

(76) Inventors: Peter H Rehm, 115 E. 900 S., Orem, UT (US) 84058; Rachel Rehm, 115 E. 900 S., Orem, UT (US) 84058

( * ) Notice: Subject to any disclaimer, the term of this patent is extended or adjusted under 35 U.S.C. 154(b) by 585 days.

(21) Appl. No.: 10/777,814

(22) Filed: Feb. 11, 2004

(65) Prior Publication Data

US 2004/0162126 A1  Aug. 19, 2004

Related U.S. Application Data

(60) Provisional application No. 60/446,785, filed on Feb. 11, 2003.

(51) Int. Cl.
*A63F 9/24* (2006.01)
(52) U.S. Cl. .......................................................... 463/9
(58) Field of Classification Search .................... 463/9; 273/153 R, 156, 240; 434/169, 177, 307 R, 434/323; 364/419.01, 419.04
See application file for complete search history.

(56) References Cited

U.S. PATENT DOCUMENTS

| | | | | |
|---|---|---|---|---|
| 4,616,327 A | * | 10/1986 | Rosewarne et al. | ......... 345/636 |
| 5,114,291 A | * | 5/1992 | Hefty | ............................. 412/8 |
| 5,513,116 A | * | 4/1996 | Buckley et al. | ............. 700/233 |
| 5,667,438 A | * | 9/1997 | Rehm | .............................. 463/9 |
| 5,765,874 A | * | 6/1998 | Chanenson et al. | ........... 283/67 |
| 5,781,730 A | * | 7/1998 | Reimer et al. | ............... 709/203 |
| 5,993,048 A | * | 11/1999 | Banks et al. | ................. 700/233 |
| 6,453,300 B2 | * | 9/2002 | Simpson | ...................... 705/26 |
| 6,859,206 B2 | * | 2/2005 | Cleveland | .................... 345/471 |
| 2003/0191816 A1 | * | 10/2003 | Landress et al. | ............ 709/219 |
| 2006/0261547 A1 | * | 11/2006 | Uzuanis | .................. 273/157 R |

OTHER PUBLICATIONS http://web.archive.org/web/20040103045704/www.personal-puzzles.com/ffcpuzzles.html, website, Jan. 2004.*
http://web.archive.org/web/20021122093959/http://puzzlemaker.school.discovery.com, website, Nov. 2002.*
http://www.archive.org/web/20000819165931/http://www.custompuzzles.com, website, Aug. 2000.*

* cited by examiner

*Primary Examiner*—William M. Pierce

(57) ABSTRACT

A questionnaire about a predefined topic is presented to the user of a computer, either via software or over a network. The questionnaire includes suggestions for clues or words of a word puzzle, such as a crossword puzzle or word search puzzle. The user need only answer a few of the questions. The user may also modify the questions and add new ones. When the user presses a button, the computer presents a custom word puzzle based on the questions and answers. The user is presented with a choice of background pictures also related to the topic, and the option to purchase various grades of the custom puzzle. A private webmaster's configuration area makes it easy to make this questionnaire and puzzle maker available from any website. It also makes it easy to customize the questionnaire, pictures offered and other matters according to the website.

15 Claims, 17 Drawing Sheets

Fig. 1A  10

Wedding Puzzles

Make your own puzzle now. It takes just a couple minutes.

Answer as many questions as you want. You do not need to answer all of them. Any question you answer will appear in your puzzle. When you are finished, press the button and your puzzle will appear!

Returning users
[ Login ]

Topics for other occasions
[ Select ▼ ]

Puzzle Title: [ Jane & John ]
Subtitle (optional): [ February 11, 2003 ]

| Questions or Clues | Answers | |
|---|---|---|
| Bride's name | Jane Doe | |
| Groom's name | John Doe | |
| Father of the Bride | James | |
| Mother of the Bride | Mary | |
| Father of the Groom | Joseph | [ Done ] |
| Mother of the Groom | Susan | |
| Maid of Honor | | |
| Best Man | | |
| Where the couple met | College | |
| Honeymoon destination | Hawaii | [ Done ] |
| Flavor of the wedding cake | Lemon | |
| Where the reception is being held | | |

Hint: Change to "will be held" if puzzle will be solved before reception.

| | | |
|---|---|---|
| Bride's employer | | |
| Groom's employer | | |
| Bride's favorite sport | Volleyball | [ Done ] |
| Groom's favorite sport | Football | |
| Bride's favorite type of music | | |

Fig. 1B

Any clue you want — Answer to the clue

| Clue (12, 20) | Answer (14, 10) |
|---|---|
| Groom's favorite type of music | |
| Bride's pet | Cat |
| Groom's pet | Dog |
| Bride's favorite song | |
| Groom's favorite song | |
| Couple's favorite song | |
| Bride's hobby | Shopping |
| Groom's hobby | |
| Bride's favorite food ▼ | |
| Groom's favorite food ▼ | Pizza |
| Bride's favorite movie ▼ | |
| Groom's favorite movie ▼ | |
| Groom's favorite color | Blue |
| Bride's favorite color | Blue |
| | |
| | |
| | |
| | |
| | |
| | |

Done (34) · 16 · Done · 48 · 48 · 20 · 26 · 22 · 16 · Done

Word Bank (A list of the answer words) — 28
On separate sheet ▼

[More Spaces] — 30    [I'm Done. Make my puzzle.] — 32

*Fig. 5*

122 — Puzzle
Change clues, answers or title
Change font styles
File: Save  New  Open

124 — Background
Browse suggested pictures
Search all pictures
Upload a picture

126 — Final Printing
Plain Puzzle

128 — CLICK HERE TO PRINT
(Prepare PDF)

120  Preview

Premium | Plain | Web Page

*Jane & John*
*February 11, 2003*

ACROSS
4  Bride's name
5  Bride's pet
6  Father of the Groom
9  Bride's favorite sport
11 Mother of the Groom
14 Groom's name
15 The groom's favorite food
16 Where the couple met DOWN
1  Mother of the Bride
2  Groom's favorite sport
3  Groom's favorite color
7  Bride's hobby
8  Honeymoon destination
10 Flavor of the wedding cake
12 Groom's pet
13 Father of the Bride

Fig. 6
Jane & John
February 11, 2003

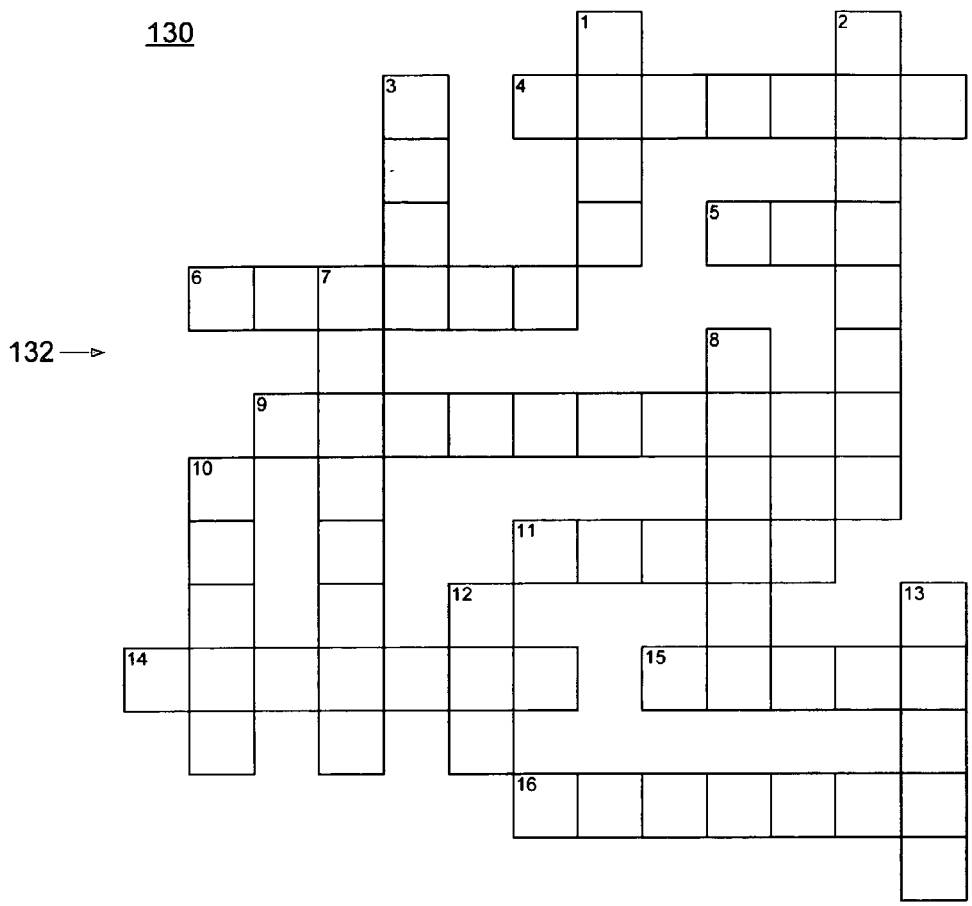

ACROSS
- 4 Bride's name
- 5 Bride's pet
- 6 Father of the Groom
- 9 Bride's favorite sport
- 11 Mother of the Groom
- 14 Groom's name
- 15 The groom's favorite food
- 16 Where the couple met DOWN
- 1 Mother of the Bride
- 2 Groom's favorite sport
- 3 Groom's favorite color
- 7 Bride's hobby
- 8 Honeymoon destination
- 10 Flavor of the wedding cake
- 12 Groom's pet
- 13 Father of the Bride

WORD BANK: Blue, Cat, College, Dog, Football, Hawaii, James, JaneDoe, JohnDoe, Joseph, Lemon, Mary, Pizza, Shopping, Susan, Volleyball

Word Bank  140

| | | | |
|---|---|---|---|
| Blue | Football | JohnDoe | Pizza |
| Cat | Hawaii | Joseph | Shopping |
| College | James | Lemon | Susan |
| Dog | JaneDoe | Mary | Volleyball |

Fig. 9

Jane & John   160

Find the words in the grid. Words can go horizontally,
vertically and diagonally in all eight directions.

← 162

| H | N | L | F | H | Y | A | T | C | Y | R | D |
|---|---|---|---|---|---|---|---|---|---|---|---|
| E | H | V | L | K | X | N | Z | T | W | G | P |
| O | L | O | L | L | L | L | M | Z | C | N | I |
| D | M | L | A | N | E | A | G | A | I | I | M |
| N | J | L | B | J | R | M | T | O | A | P | V |
| H | A | E | T | Y | B | P | O | W | D | P | M |
| O | N | Y | O | H | L | T | A | N | B | O | H |
| J | E | B | O | H | U | H | L | L | L | H | Z |
| V | D | A | F | L | E | J | A | M | E | S | W |
| R | O | L | E | G | E | L | L | O | C | Z | N |
| M | E | L | F | K | Q | K | S | U | S | A | N |
| D | K | K | Y | K | K | H | P | E | S | O | J |

Blue  
Cat  
College  
Dog  
Football  
Hawaii  
James  
Jane Doe

John Doe  
Joseph  
Lemon    ← 164  
Mary  
Pizza  
Shopping  
Susan  
Volleyball

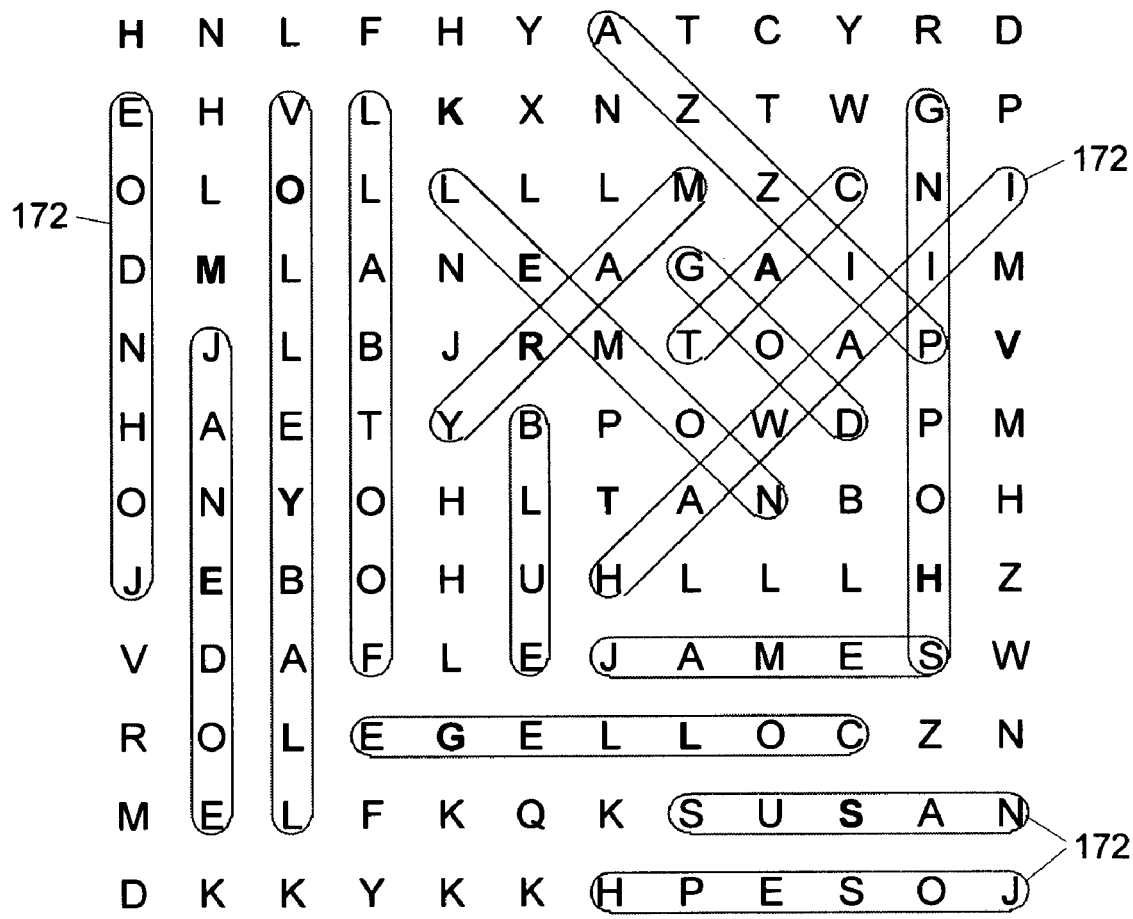

Fig. 11

Webmaster's Private Area _180_     [Logout] _184_
   Logged in as: sample@account.demo _182_

Your Contact Information    Change _188_
   Willy Webmaster, 1 Main St., Anytown, AA, 00000 USA _186_

Announcements    View All _192_
   Feb 17:    50 new background images are available
   Jan 30:    Recommend all webmasters download activity archive prior to pruning

Activity    View Details _198_    View Archive _200_    (17 sessions currently running) _194_

| | Visitors | Puzzles Made | Sales | Earnings | |
|---|---|---|---|---|---|
| Today: | 44 | 53 | 2 | $4.35 | ← 196 |
| This week: | 2523 | 3642 | 75 | $186.24 | |

Puzzle Maker Configuration (Topic and type of puzzle)    _204_

[Rotating seasonal (freeform crossword) ▼]    [Make Link to It]
_202_

You can choose any of the configurations listed or    ─── Advanced ───
your can make a new one for a topic of your own.    _206_    _208_
Press Edit to modify an existing configuration.    [Edit]    [Rename]
Press New to create a new one. Edit the Rotating
configuration to enable or disable rotating topics.    [New]    [Delete]
                                                                                     _212_      _210_

Fig. 12

Webmaster's Private Area _220_     [Logout] _184_
   Logged in as: sample@account.demo _182_

Create New Configuration (topic and type of puzzle)

New Configuration Name _222_    Puzzl Type _224_
[                     ]    [Freeform Crossword ▼]

Optional: Copy initial c nfigurati n data from: _226_     _228_
[None -- Start with blank configuration ▼]    [Create]

Fig. 13A

Webmaster's Private Area — 230
Logged in as: sample@account.demo — 182

[ Logout ] — 184

Editing: WeddingPuzzles.com (freeform crossword) — 232

Press [ Save ] or change tabs to save your work. — 234

240 —

| Questionnaire | Preview | Images | Colors | Pricing | Emails | — 236

Banner Text — 242    Font [ Helvetica; san ▼ ]   Style [ Bold ▼ ]   Size [ 28 ▼ ]

Or image file: [ WeddingPuzzles.jpg ] [ Browse ] [ Upload ]
                 250       252     254 — 238

Line below banner — 256
[ Make your own puzzle now. It takes just a couple minutes. ]

Instructions — 258
[ Answer as many questions as you want. You do not need to answer all of them. Any question you answer will appear in your puzzle. When you are finished, press the button and your puzzle will ▼ ]

Title/Subtitle prompts: [ Puzzle Title: ] — 260   [ Subtitle (optional): ] — 262

Suggested clues. Press Enter key once or twice between clues. — 264

```
{Bride's name}     — 268
{Groom's name}
Father of the Bride
Mother of the Bride — 266
Father of the Groom
Mother of the Groom
Maid of Honor
Best Man
Where the couple met — 266
Honeymoon destination
Flavor of the wedding cake
```

270 —
- To also suggest an answer, put it in <angle brackets>.
- To provide a hint above the suggested clue, put the hint in [square brackets] *before* the suggested clue (or *after* for below clue).
- Example: "[For expectant mothers who fear childbirth:] New mother's preferred delivery method<stork>." Click for more help. — 272

[ Preview Questionnaire ] — 274

Fig. 13B

Tabs: Questionnaire | Preview | Images | Colors | Pricing | Emails ← 236

(280 points to Preview tab)

Here you can customize your sales pitch and other prompts.
To not provide a function, just leave its prompt field blank. — 238

| | | |
|---|---|---|
| Puzzle Section: | Section header: | [Puzzle] |
| Edit puzzle: | [Change clues, answers or title] | |
| Fonts: | [Change font styles] | |
| File: Save/New/Open | [File:] [Save] [New] [Open] | |

| | | |
|---|---|---|
| Background Section: | Section header: | [Background] |
| Browse theme images: | [Browse suggested pictures] | |
| Search all images: | [Search all pictures] | |
| Upload image: | [Upload a picture] | |

| | | |
|---|---|---|
| Output Section: | Section header: | [Output Choices] /282 |
| Choice with picture: | [1. Premium Puzzle (pdf)] | ☒ Show price here |
| Description: | [Choice of background pictures. Also includes plain puzzle.] | /284 |
| Sample Link: | [Show full-size sample (pdf)] Change sample | |
| Buy Link / Comments: | [BUY] [(Your printer or ours)] | |

/282

| | | |
|---|---|---|
| Choice with no picture | [2. Plain Puzzle (pdf)] | ☒ Show price here |
| Description: | [Professional look. No ads.] | |
| Buy Link / Comments: | [BUY] [ ] | |

| | |
|---|---|
| Web page choice: | [3. Web Page Puzzle (html)] |
| Description: | [Free with sponsor's message] |
| Buy Link / Comments: | [Show] [ ] |

[Preview this page] — 286

Fig. 13C

| Questionnaire | Preview | Images | Colors | Pricing | Emails | ← 236
/ 290

Here you can suggest images that are related to the puzzle topic.
Draw from our stock images and the pool of images you have uploaded.
/ 238

❶ We provide many images. Click
book icons to expand categories.

❷ <u>Upload Images</u>. Click if you want
to provide your own images.
/ 304

Our stock images (click to expand)

- 📕 Anniversary
- 📕 Apology
- 📕 Baby Shower
- 📕 Birthday
  - 📕 Boy       292
  - 📕 Girl
- 294 📄 Age 0-3
- 📄 Age 4-7
- 296 📄 Age 8-11

Your pool of uploaded images

- 📄 AbstractRock.jpg
- 📄 SwirlyFlower.jpg

306

Note: The above images are available at this screen in all your configurations.
They are not offered in *this* configuration until you add them, below.

❸ Select Images. To select theme-related images, click a category or image
name above. Image thumbnails will appear below or on another page. Press
the "Add" button by each thumbnail to confirm that you recommend it.

Image Preview

/ 300

/ 302
[ Add → ]

Swirly Flower.jpg

Images you recommend

SwirlyFlower.jpg
Beach.jpg
PalmTree.jpg
Eggs.jpg
Clouds.jpg

\ 298

❹ Final st p: After gathering the images you want to recommend, click
below to arrange them for presentation and to remove unwanted ones.

[ Preview and Arrange ]
\ 308

Fig. 13F

Questionnaire | Preview | Images | Colors | Pricing | Emails

Here you can prepare emails and schedule them for automatic delivery. To prevent abuse, changes will be reviewed before activation.

[X] Upon Saving of Puzzle
Subject: [Your custom puzzle <PuzzleTitle>]

```
Recently you made and saved a custom puzzle on the Internet.
You can access your puzzle online for at least 30 days by
clicking on this link:  <PuzzleLink>
```

[X] Reminder [7] days after saving
Subject: [Your custom puzzle <PuzzleTitle>]

```
Recently you made and saved a custom puzzle on the Internet.
You can access your puzzle online for at least 30 days by
clicking on this link:  <PuzzleLink>
```

[X] Reminder [27] days after saving
Subject: [Your custom puzzle <PuzzleTitle>]

```
Last month you made and saved a custom puzzle on the
Internet. If you want to keep this puzzle, please access it now by
clicking on this link:  <PuzzleLink>. This will renew your puzzle
```

[X] Upon Purchase
Subject: [Your custom puzzle purchase. Invoice #<Invoice>]

```
Dear <BuyerName>,
Thank you for your purchase of a custom puzzle. You can
access your puzzle online for at least 60 days by clicking on this
```

[X] Reminder [31] days after purchase
Subject: [Your custom puzzle purchased <PurchaseDate>]

```
Last month you purchased a custom puzzle on the Internet. In
case you have forgotten how to access it, here is the link:
<PuzzleLink>
```

[ Submit for Aproval ]

QUESTIONNAIRE METHOD OF MAKING TOPIC-SPECIFIC WORD PUZZLE DOCUMENTS

CROSS-REFERENCE TO RELATED APPLICATION

This application claims the benefit of Provisional Patent Application Ser. No. 60/446,785 filed Feb. 11, 2003.

BACKGROUND OF THE INVENTION

Crossword puzzles and word search puzzles have been favorite pastimes for millions of people in the United States for generations. These puzzles are available in newspapers and magazines. Custom puzzles are harder to come by. They can be made by hand or with the help of a computer or service. As custom puzzles are becoming easier to make, they are finding more and more use in education and at private parties and other occasions such as weddings, where they are sometimes presented to guests rolled and tied with ribbons.

Crossword puzzles come in several types, including fully-crossed crossword puzzles and freeform crossword puzzles. The main characteristic of freeform crossword puzzles is that they can be made from almost any arbitrary set of answer words. Thus they are the best choice when the puzzle must be on a predetermined topic and generic words are undesirable. It is not necessary to add generic words to make the crossings work. This type of puzzle is often used in education. These puzzles sometimes go by the name criss-cross puzzles.

The main characteristic of fully-crossed crossword puzzles is that all letters in the answer grid are at the intersection of two answer words. This feature has the advantage to the solver that there are always two ways to solve any given cell: the across word and the down word. If the solver finds the clue to an across word too difficult, there are several intersecting down words that when solved can provide additional clues for the difficult across word.

Fully-crossed crossword puzzles often have no theme. If they do have a theme then they typically do not contain many preselected answer words related to that theme. This is because these puzzles require many generic words to make the crossings work.

Sometimes fully-crossed crossword puzzles do have more than just a few words related to a theme. This can be done for topics that are so broad that tens of thousands of words are related to the topic. The topic of television is an example. Another way to provide more entries (clues plus answers) related to the theme is to write a clue for a generic word in such a way as to make it relate to the topic in some way. For example, if the topic is "animals," words such as "zebra," "bird," and "opossum" are inherently part of the topic. Generic words such as "water" and "soft" can be clued in a way that makes them relate to the topic by referring to what most animals drink or the texture of a mink's fur, respectively.

A tightly-crossed crossword puzzle is a crossword puzzle with a grid that would be fully-crossed if it were not for a few blind cells. Blind cells are cells that are in one word only. They are called "blind" because the puzzle solver can not verify the correctness of a guess by turning to a perpendicularly intersecting word. A tightly-crossed crossword puzzle has the same characteristics as a fully-crossed crossword puzzle in the areas where every cell is at an intersection of words and where the words contain no blind cells.

Fully-crossed crossword puzzles are usually made with grids that are symmetrical, meaning that the pattern of black and white squares is identical when it is turned upside down. This is because symmetrical grids are more attractive. Sometimes the term symmetrical crossword puzzle is used loosely to include fully-crossed or tightly-crossed puzzles with grids that have no symmetry.

The main characteristic of word search puzzles is that a predetermined list of words is hidden in a two dimensional array of letters. Usually the hidden words can go in any direction forward, backward, up, down or any of four diagonals. The puzzle can be simplified for children by omitting some of the harder directions. Word search puzzles also go under a variety of names including word find puzzles and circle-a-word puzzles.

Software programs that create freeform crossword puzzles and word search puzzles have been available for decades. Such programs have been available for the Microsoft DOS and Windows and various Apple Computer Inc platforms, as well as other brands of computers. With the advent of the Internet, web sites have sprung up that allow anyone to make freeform crossword and word search puzzles online.

Software and web sites that create word search puzzles and freeform crossword puzzles are not difficult to develop. On the other hand, software that creates symmetrical crossword puzzles has been the subject of many research papers, a few graduate level theses or dissertations and one patent, U.S. Pat. No. 5,667,438.

To create a word search puzzle, these programs and websites provide a way for the user to type in a set of words and press a button to create the puzzle. To create a freeform crossword puzzle, these programs and websites provide a way for the user to type in a set of words and corresponding clues and press a button to create the puzzle. Then they typically show the puzzle and report whether or not all words were used in the puzzle.

This latter report is important because sometimes the program can not get all of the words into the puzzle. One common reason is that the words can not fit inside predetermined maximum dimensions of the puzzle grid. (This limitation may be programmer-imposed or user-imposed.) Typically, this space limitation is the only reason for not getting a word into a word search puzzle. However, for a freeform crossword puzzle, the matter is much more complex:

The answer words can not fit into predetermined maximum grid size.

If the answer words have too many very short words (e.g., 2, 3 and 4-letter words) then these programs can't assemble them into a freeform puzzle. When the words are very short, they have few places on them where another word can intersect. Freeform puzzles work best with a mixture of short and long words.

The answer words include a one-letter word. A one letter word is not long enough to "cross" another word and have some cells extending in a perpendicular direction to show that there is a crossing. Therefore, these programs don't know what to do with one-letter words.

Sometimes an answer word can't hook into the puzzle because it doesn't share any letter with any of the other answer words. For example, for the word CUP to be used in a puzzle, there must be a C, U or P somewhere else among the answer words.

A situation like the latter one can arise, but more complex, in which too many words are trying to hook into the same few letters in the rest of the puzzle. While there may be another C, U or P, it is always tied up by another word either at that letter or immediately next to it.

Even with these challenges, the fact is that most combinations of answer words that people really use can be constructed into a crossword puzzle. Nevertheless, the risk that an important word may be omitted is an annoyance to the user.

When a word is omitted, it is unclear why. The user has to either accept the incomplete puzzle or go back and try again. Trying again may mean just reconstructing over and over with the same word list, hoping that some different set of random events will result in a complete puzzle. If this doesn't work, the user is left to make changes to the answer word list until the software either includes the word or the user gives up trying. Often these changes are meaningless blind guesses formed to overcome a technical problem and are rarely helpful for preparing a better puzzle.

The software program and websites vary in how user-friendly they are, but they do require considerable creativity in coming up with words to find or answer words and clues.

OBJECT AND SUMMARY OF THE INVENTION

A main objective of the current invention is to make it so easy to make a custom puzzle on popular topics that people who have not considered the possibility are easily pursuaded to give it a try.

Another main objective of the current invention is to make it easier for people to make a custom puzzle on a topic of interest to them. Another objective is to reduce the barrier of entry for people want a custom puzzle but do not know how to make one.

Another objective of the current invention is to provide a puzzle creation tool that presents a framework for making a puzzle on a specific topic, often related in some way to the topic of a website, in which the puzzle can be customized by merely answering a few easy questions.

Another objective is to help the user to create crossword clues by providing topic-specific clues that they can actually use. A further objective is to allow the user to adapt these clues to their use by easily and intuitively presenting options to use, reject, or modify individual clues and to add still more clues of their own.

A further objective is to increase the robustness of freeform crossword puzzle construction so that none of the user's answer words are ever left out of the grid. In other words, given enough room, any combination of proposed answer words can be assembled into a freeform crossword puzzle grid.

Another objective is to solve a problem that occasionally arises in the creation of freeform crossword puzzles, in that one-letter answer words are accepted and used in a sensible manner.

Another objective is to provide a tool on a website that enables webmasters to easily link to the current invention in such a way as to earn commissions from puzzle sales.

Still another objective is to provide a tool on a website that enables webmasters to easily customize the invention so that the suggested topic of the puzzles relates to the topic of the webmaster's website.

BRIEF DESCRIPTION OF THE DRAWINGS

FIGS. 1A and 1B show a questionnaire with some answers filled in.

FIG. 5 shows the preview page after purchase.

FIG. 6 shows a freeform crossword puzzle page with a word bank.

FIG. 9 shows a word search puzzle page.

FIG. 10 shows a word search puzzle solution page.

FIG. 11 shows the home page for the webmaster's private area for configuring the invention.

FIG. 12 shows the page for creating a new configuration of the invention.

FIG. 13A shows the edit configuration page of the invention, with the tabbed variable area set to the "Questionnaire" tab.

FIGS. 13B–F show only the tabbed variable area of the edit configuration page of FIG. 13A, set to each of the other tabs, respectively.

DESCRIPTION OF THE PREFERRED EMBODIMENTS

The Questionnaire

Figure 2:
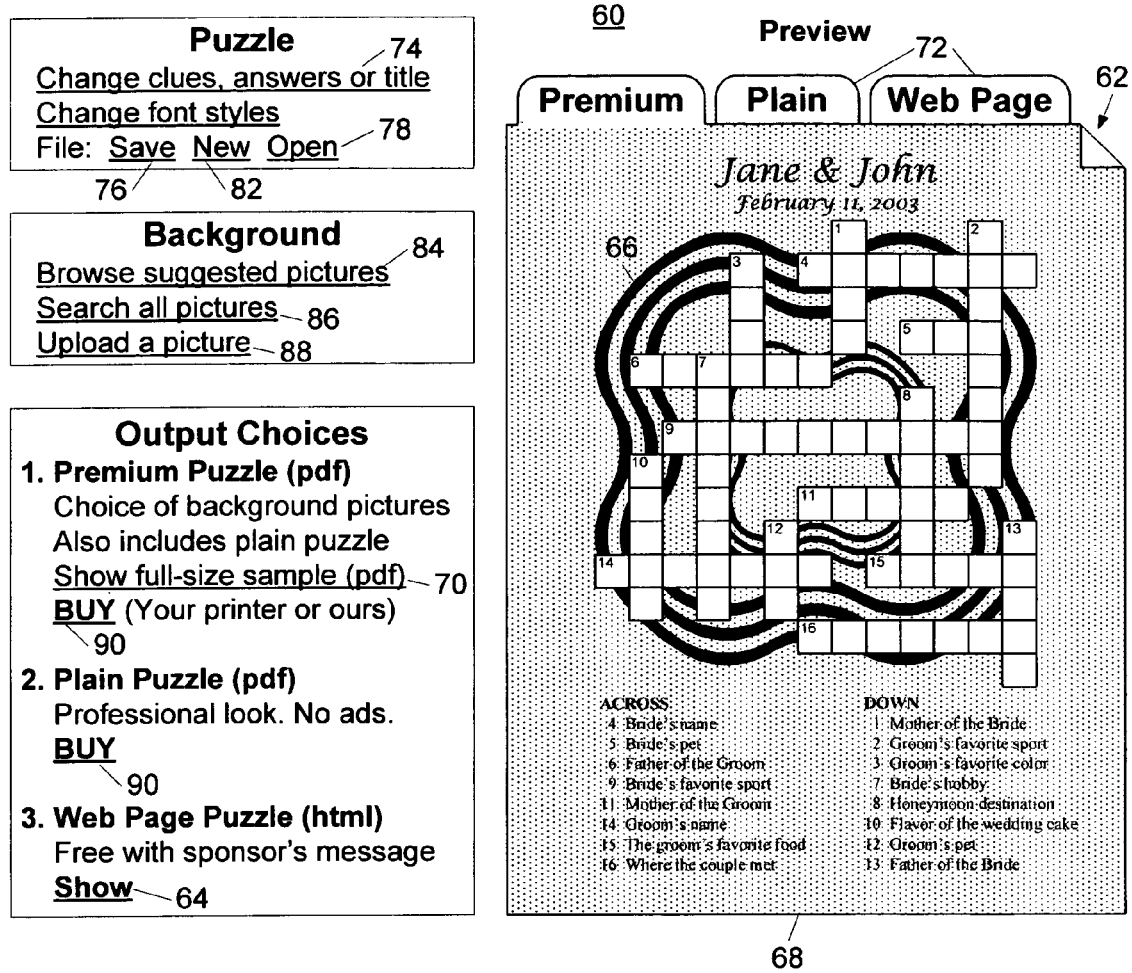
FIG. 2 shows a preview page after puzzle construction and before purchase.

FIGS. 1A and 1B show a questionnaire that represents the starting point of puzzle construction for the user. This questionnaire can be provided in Internet web browser or as stand-alone software. A web browser can present the form as a web page or in an applet that either conveys the form response back to a web server or processes it locally on the same computer that presents the form.

The Questionnaire 10 has a questions section 12 and an answers section 14. The questions section 12 features several prepared questions. The answers section 14 includes answer input fields 16 where the user can supply answers to the questions. The question and answer input fields are paired so that it is clear where to put the answer to each question.

In the questions section 12, the prepared questions may be provided in either static text fields 18 or in preloaded input fields 20. A preloaded input field 20 is an input field 22 that already has text in it when it is presented to the user. The advantage of a preloaded input field 20 is that the user can rephrase the question if is desired.

The Questionnaire 10 can also optionally include additional input fields 22 in which no questions are preloaded. In the preferred embodiment shown, some of the prepared questions are in static text fields 18 and other prepared questions are in preloaded input fields 20; and then there are also question input fields 22 with their corresponding answer input fields 24. FIG. 1B also shows two question input fields 26 with questions that were not preloaded but were typed by the user.

Figures 7, 8:
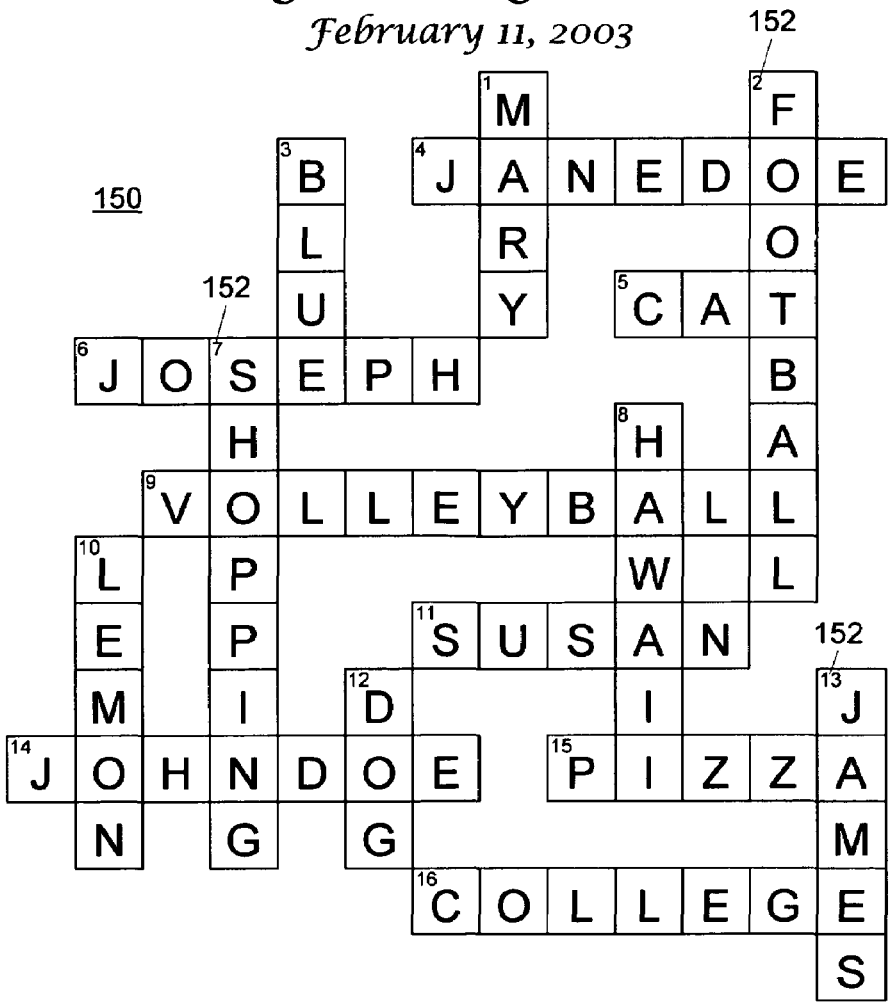
FIG. 7 shows an alternative form of word bank.
FIG. 8 shows a freeform crossword puzzle solution page.

The preferred embodiment of the invention provides for an optional word bank (see FIGS. 6 and 7). A word bank is a list of the answer words provided with the puzzle (not the solution). Such a list makes solving the puzzle much easier in case the answers are not something that can be readily guessed. It is especially helpful for children. When provided, the list may be unsorted or sorted randomly, alphabetically, or by size. It is preferred that the list be sorted alphabetically for teens and adults or sorted by size for small children.

At the user's option, the word bank may be omitted, prominently positioned next to the puzzle grid, positioned in a subdued manner across the bottom of the page, provided in a third clues section equal in weight to the Across and Down clues sections, or provided on a separate sheet. Providing it on a separate sheet has the advantage of not taking up space from the puzzle and using the same puzzle sheet for people who do and don't want the word bank. Thus, the questionnaire includes a pull down list of word bank options 28. These options include "No word bank," "On separate sheet" (this is the default choice), "At bottom of puzzle," "As third section of clues," and "Next to grid (if space is available)."

According to the preferred embodiment, unless directed otherwise by the user, the invention will provide the puzzle both with and without the word bank since both versions may be useful at one activity. Then the puzzle solver may choose the level of challenge they want to take on.

FIG. 6 shows an example freeform crossword puzzle 130 made according to the questions and answers shown in FIGS 1A–1B. It shows the puzzle grid 132 and clues 134. However, the word bank 136 is shown using the "at bottom of puzzle" option, contrary to the selection shown in FIG. 1B at item 28.

FIG. 7 shows the word bank 140 according to the "On separate sheet" option.

FIG. 8 shows the solution 150 to the crossword puzzle shown in FIG. 6. Preferably the solution 150 is provided in registration with the puzzle, so that the two can be held up to a light for easy comparison. However, when many copies of the puzzle are ordered, several reduced size copies of the solution 150 could also be provided on the same page. Then only a few solution pages need to be printed, and these can be cut up into several slips of paper, one for each puzzle solver. The cell numbers 152 are optional. They should be omitted if they would be too crowded.

Back to FIGS 1A–1B, the questionnaire may also include options such as for cell size and shape. These options allow the user to predetermine the size and shape of the puzzle grid cells. The options for shape are square and rectangular. The invention tries to use the largest square cells that will reasonably fit, but it will revert to tall rectangles if necessary. Usually, it is best to leave the puzzle cell size and shape up to the computer, and not to override them with these options. The preferred embodiment of the invention provides for automatically finding the best cell size and shape, thus these options are not shown.

One of the advantages of the current invention is that the user does not need to invent the questions. This is important because the questions become the clues and crossword clues are generally written in a certain style that is unfamiliar to most people. Even those who have solved crossword puzzles may make mistakes when attempting to write clues for the first time.

Another advantage of the current invention is that the user only needs to know the answers to some of the questions that are already provided.

The user answers some of the questions by typing or otherwise placing answers in the answer input fields 16. In the most preferred embodiment, it is not necessary that the user answer all of the questions. Usually there is no limit to how many or few questions the user has to answer. In case the person who prepares the questions wants to require the user to answer a minimum number of questions, including all of them, or certain particular ones, then the invention can accommodate this, but this capability is not required for the preferred embodiment and is not shown.

The user may just give as many answers as come to mind quickly, or the user may carefully consider each question and answer and type in more questions, according as the user desires.

If desired, the user can press the More Spaces button 30 to obtain a few more question input fields 22 with their corresponding answer input fields 16. This gives the invention a chance to consider whether the puzzle will fit on a single page. It should provide only a few more spaces at a time so long as they will fit on a page If the answers given thus far are very long (have many letters, collectively), then the invention should warn the user that the puzzle is very large and will either have very small features (cell sizes, font sizes) or will have to be provided on two separate sheets. It may ask the user which of these choices is more acceptable, or whether the user prefers to delete some answers, making the puzzle more manageable. It will be enough for the invention to provide a warning such as: "Your puzzle is large, which do you prefer:" Below this warning, the invention would provide radio buttons or a selection box for choosing between small features and a additional page.

According to the preferred embodiment, the user indicates that he or she is finished by pressing a button. This button bears the indicia "I'm Done! Make my puzzle" 32 or simply "Done" 34. Either button has the same effect. Having both the "I'm Done . . . " button 32 and the column of "Done" buttons 34 is optional. The spaced "Done" buttons 34 help new users understand what to do. They are also convenient because often eliminate the step of scrolling down to the bottom of the page.

The questionnaire can also have a banner 36, a line below banner 38, instructions 40, a title input field 42, a subtitle input field 44 and some occasional hints 46.

Occasionally, the person preparing the questionnaire will have a list of closely related questions that should not all be presented at once. For example, the questions may all really be asking the same thing, but may require modification depending on an attribute of the answer, such as gender or number. The invention provides for this by allowing a question selection box 48 to present all of these related questions in one field. The user thus just pulls down the list and selects the appropriate question.

Checking the Questionnaire Response for Errors

When the user presses this "I'm Finished" button, the computer checks the input field contents for certain error conditions and then either reports an error or proceeds to create the puzzle.

One error condition that the computer checks for is that all of the input fields are blank, which means there is nothing to do.

Another error condition is if the user provides an answer with a space or other punctuation in it. Spaces are not considered legal in crossword puzzle answer grids. The standard practice is to run two or more words together without spaces and append "(2 wds)" or "(3 wds)" to that answer's clue. The invention should remove the spaces, modify the clues if necessary and report what it has done to the user. If the user has specified a word bank, then the clues do not need to be modified.

Certain types of punctuation such as periods, commas, and apostrophes are generally-omitted as well without any mention in the clue. Thus, for example, "Martin Luther King, Jr." should become "MARTINLUTHERKINGJR" and "Smith's Bakery" should become "SMITHSBAKERY".

The invention provides that punctuation marks should be omitted automatically only if the user did not specify a word bank. If the user did specify a word bank, then the changes should only be suggested to the user.

An alternative that is within the scope of the invention is to provide a separate selection box (not shown) so that the user may indicate whether the answers should be converted to standard form (the default) or whether they should be used without modification.

Another error is that a numerical answer is given in digits, rather than in words. This causes a problem because often the digits will have no place to cross. The preferred response is to convert small numbers to their word equivalents. For example, "0" is converted to "zero" and "21" is converted to "twentyone" (note the absence of a space). If the number is very large, this becomes impractical and the answer will have to be "forced" into the puzzle using a new method described below. If the answer is a mixture of letters and digits such as "catch-22", then it should be used as is since it has at least some letters that can form crossings.

Another possible error condition is that one or more input fields include a one-letter answer. One letter words are generally not recognized as being usable in a crossword puzzle. They are not long enough to have a direction (across or down) and also create visibility problems in the puzzle grid if they are entirely contained in another word. However, the current invention can be configured to permit one-letter answers. If it is so configured, the presence of a one-letter word is not an error condition.

Another possible error condition is that a custom (typed in) question is not answered. This is most likely the user's oversight and not a decision to not answer a question.

Another possible error condition is that there is a non-blank answer to a blank question input field. It does not matter whether the question input field was initially provided with a prepared question.

Another possible error condition is that some of the answers can not be found in a spelling dictionary of words and names. Spell checking is an optional step of the invention.

Another possible error condition is that an answer is too long. Answers that are too long can result in awkward puzzles with cell sizes that are too small.

If there is an error condition or suggestion to be made, the invention proceeds to the preview page (FIG. 2) and also reports the error or suggestion. These should be reported in a separate pop-up window. The error report should explain how to get back to the questionnaire page to fix the errors. It should explain the rational behind the suggestions. For example, it could explain that experienced solvers will be thrown off by spaces or punctuation in the answer grid.

The report could also be given as a list at the bottom of the preview page. However, a pop-up window is preferred so that list of errors and suggestions will still be available when the user returns to the questionnaire page.

The list of errors will include a list of words that were not found in a spell-check dictionary. It may suggest some correct spellings. If may suggest that the user confirm the correct spellings of people's names prior to using the puzzle, and that the user can proceed now and fix the spelling another day. Optionally, the spelling errors may be provided with a checkbox to indicate to the invention that those words are to be accepted as typed.

Puzzle Construction

When the computer is satisfied that it has a workable set of inputs, it proceeds to construct a puzzle. The exact manner this is done depends on the type of puzzle being created. Both crossword and word search puzzles are built on a grid. The "grid" should be thought of as a two-dimensional array of cells in rows and columns. "Cells" are places reserved for a character. Often these are places in which the puzzle solver places a character so solve the puzzle, such as by writing with a pencil or typing onto a monitor screen. When the puzzle is printed or displayed, this grid may or may not have lines like graph paper separating the cells or characters. Symmetrical crossword puzzles naturally have grid lines in them. With freeform crossword puzzles, the grid lines are partially omitted to show which cells are used and which are unused by the puzzle. There are no grid lines between cells that are not used. Sometimes the unused cells are filled in with a color or background image. Word search puzzles are usually (but not always) printed without any grid lines at all.

Construction of a Word Search Puzzle

For word search puzzles, the computer prepares a two-dimensional array of letters in its memory. The array is cleared, meaning that the cells don't contain letters. Then the answer words are placed in the array one by one.

To place an answer word, a random location in the array (for the first letter) and a random direction (for the rest of the letters) are chosen. The word does not fit at a proposed location and direction if it would cause the word to run off the edges of the array or if the word would run over an existing word, unless the letters happen to be identical. If a fit is not found, the location or direction is incremented until all locations and directions have been tested.

If the word does not fit in the array at all, it is marked in the computer's memory as an unplaced word. If there are any unplaced words after all words have been tried, then the computer should try again from the beginning with a larger array size. Alternatively, the computer can start with a-huge array the first time, something that has, say, 10 times as many letters in it as the total number of words in the word list. This is virtually guaranteed to be successful. Then it incrementally reduces the size of the array with each construction attempt until many (say 50) attempts at constructing the puzzle leave out a word. The last attempt that was entirely successful is given to the user. This method works best if the words are inserted by order of length, from longest first to shortest last.

It also helps if a tally of directions is kept so that the number of words in each direction is readily accessible. Then the directions are chosen for testing in the following order: Directions that have the fewest number of words to directions that have the most number of words.

After all the words have been placed, the unused cells in the grid are filled in with more-or-less random letters. For English language puzzles, it helps to avoid using vowels plus S and F to avoid accidental offensive or taboo words. The preferred embodiment provides that the computer be provided with a list of taboo words that should never spontaneously show up in a word search puzzle. The computer then avoids taboo words by checking for them in all directions and fixing the problem if even one taboo word is found, unless that word is a user's answer word or is entirely within a user's answer word. If it is entirely within a user's answer word (forward or backward) the user may be warned so they can decide whether to use that answer word or find another.

The preferred method of fixing the problem is to just reconstruct the puzzle. Slightly more efficient methods, such as replacing all filler letters, the offending filler letters, swapping answer words, etc, are less efficient in terms of programmer time and also add complexity that can be difficult to test, risking programming bugs that are hard to catch. The spontaneous occurrence of a taboo word is rare and unlikely to happen again if the puzzle is reconstructed. The reconstruction and retesting is instantaneous from the user's point of view. However, to avoid forever loops, the construct & test loop should be done only a limited number of times. (A forever loop is likely only if a word list is crafted to deliberately generate spontaneous taboo words, without containing any taboo words itself.)

The letters in a word search puzzle are usually in rows and columns only. This is the most preferred type of word search puzzle. However, they also may be arranged with every even numbered row offset to the right (or left) by half the distance between columns, thus creating a hex-like grid with six directions. When this hex arrangement is printed, the distance between rows may be reduced so that the six directions are closer to being equally-spaced 60 degrees from each other.

Construction of a Symmetrical Crossword Puzzle

A method of constructing symmetrical crossword puzzles is disclosed in U.S. Pat. No. 5,667,438 to Rehm, "Method of Constructing Crossword Puzzles by Computer," the specification of which is incorporated herein by reference. To link the current invention with this patent, it is helpful to limit the questionnaire to only a few short answer words (such as nine words for a puzzle of fifteen by fifteen cells) and then place them randomly as fixed theme words. If the puzzle fails to construct, then the answer words are rearranged in the same or another pattern of black and white squares, and construction is attempted again. Additional answer words can be provided as floating theme words.

While the user may be asked to indicate which words are most necessary, this can also be taken care of automatically by the computer. Certain of the provided clues, such as the names of the bride and groom in a wedding puzzle, for example, may automatically be given status as fixed theme words.

Construction of a Freeform Crossword Puzzle

For freeform crossword puzzles, the computer prepares a two-dimensional array of cells to represent the puzzle grid. The Cells can have the states of used and unused and when used can represent letters. First, the computer sets the state of all cells to unused. Then the computer randomly places answer words on the grid, preferably longest-first, in a manner similar to the word search puzzles except that the rule for when a word "fits" is different. A word fits only if it properly intersects with an existing word or if a special case is present.

One special case is that the first word to be placed does not need to find another word to intersect. It can be placed anywhere. A random starting point and direction works very well.

A second special case is a one-letter answer word. If the current invention is configured to allow one-letter words, which is the default configuration, then it is preferred that one-letter words are placed in the grid without crossing any other words. This can be done by placing them on any unused cell that has four unused neighbor cells above, below and to the left and right. Preferably, however, the invention chooses a place so that a corner of the one-letter word's single cell barely touches the corner of another cell in the puzzle.

Since a one-letter word has no direction, the clue for such a one-letter word can appear with the across clues or down clues. A simple way of implementing the invention is to treat all one-letter answers as "across" words. Preferably, however, the invention treats it as whichever direction has fewer lines of clue text for normal answers, so that the additional text consumes what would be white space and has little or no effect on font sizes and other formatting issues.

A third special case is that the invention previously discovered that some word or words are not getting in and so that if a word does not fit anywhere on the developing grid, it is forced onto the grid anyway at a place where it does not intersect any words, preferably diagonally touching corners with another word or two.

A word properly intersects if it crosses another word at an identical letter and does not create any unintended word fragments by placing two letters adjacently above, below, to the left or right of each other. Generally this means that there are no other used cells adjacent to the newly placed word except for the cells in the word that it crosses. A word may cross more than one other word at the same time. Two cells are adjacent if they are neighbors to the north, south, east or west. Diagonals are not adjacent.

Another requirement for a word to properly intersect is that the invention may be set to not allow "lonely unused cells." Lonely unused cells are unused cells that are adjacent to four used cells on their four sides. When printed, they are drawn with a line on all four sides and can look like a used cell ready to receive a written letter. To prevent this from happening, the program should allow the formation of a lonely unused cell only if there will be a background image, color, other indicia or block in that cell to visually distinguish it from a used cell. If lonely unused cells are not allowed, then the program needs to test each potential placement of an answer word to make sure that the placement does not create any lonely unused cells. If is does, the word placement under test fails.

After all words have been placed on the grid, the grid is saved for possible use and construction is repeated with a smaller grid, just as with word search puzzles. Whenever there is success with a smaller grid, the smaller grid replaces the previously saved larger grid. The smaller grid then becomes the best grid so far and is saved for possible use.

However, for freeform crossword puzzles, with each construction the computer takes note of how many words were "forced" into the puzzle in a non-intersecting manner. For a smaller grid to replace a larger grid, it is preferred that the smaller grid's number of "forced" words must be equal or smaller than the larger grid's "forced" word count. One-letter answer words always have to be forced so they will not prevent the grid size from shrinking. If there is no success with a smaller grid size after a predetermined number of attempts, then the previously saved grid is used.

Formatting the Puzzle so It Fits

After the puzzle grid has been created in the computer's memory, the computer formats the puzzle for printing. The first step of formatting was already done by the construction engine, which tried to fit the user's answers and other data into a small grid size. To proceed with the formatting, the computer tries to lay out the puzzle using default or initial formatting factors such as sizes for the cells and fonts. If the puzzle does not fit on the desired number of pages, then the formatting factors are altered and the formatting is attempted again. When everything fits then the iterative process stops and the successful formatting factors are retained for actual use. The clues are obtained from the questions in the questionnaire.

The formatting factors include the cell size and shape, the font size of the clues or word lists, the title and subtitle font sizes, the margins, the line spacing between lines of the clues or word lists, the number of columns that the clues or word lists are arranged in, and the spacing between sections of the puzzle. If the puzzle page is to include a word bank, then the font size, number of columns, spacing, etc. of the word bank are also formatting factors.

These formatting factors are altered as a group so that the various parts of the puzzle are balanced and attractive. This can be accomplished several ways. One way is to simply compute successively smaller sizes. However, according to the preferred embodiment, several sets of predetermined attractive groups of formatting factors are tested in succession. This can be done inside an iterative loop statement such as a "repeat . . . until . . . " or "while" block. The groups are arranged in order of most attractive to least attractive.

To more quickly find the first group of formatting factors that fits on a page, it is preferred that the computer skip around among the groups using the well known binary search or a similar method. For best results, the groups of formatting factors should generally be arranged so that each succeeding one is easier to accomplish than the one before. Thus, for example, comparing one group with the next, the cell size or font size should always getting smaller or staying the same. It is not necessary that both are made smaller at the same time.

If the puzzle grid is not square (having the same number or rows and columns with square cells), each formatting factor should be tested for both portrait and landscape orientation of the puzzle grid. Note that it is always possible to flip both crossword and word search puzzles around an imaginary line that extends from the upper left cell in a diagonal direction to the bottom right. This imaginary line always goes through cells from the top-left corner to the bottom right corner, even if the cells are rectangular and not square. If the grid does not have an equal number of rows and columns, then this imaginary diagonal line will not go through the lower-right cell at all, as it will have exited the puzzle elsewhere. When crossword puzzles are flipped in this manner, all across words become down words and all down words become across words, the grid cells have to be renumbered and the clues have to be resequenced accordingly.

The number of columns of clues or word lists can have a somewhat unpredictable effect on whether the puzzle fits on the desired number of pages. It is preferred that every reasonable number of columns be tried for each formatting factor and grid orientation until the puzzle fits. The invention starts with one column and works up to about five, except that for a crossword puzzle the invention first tries two columns with separate columns for across and down. If they can't be separated like that then it tries one column for both, then two columns in which the "down" section starts wherever the "across" section finishes. If there is a separate answer words list then these this list can be placed next to the grid, or across the bottom of the page (under the clues) or in a third column that is treated equal to the across and down columns. If the latter arrangement is chosen, then the first number-of-columns iteration is always to see if the puzzle can fit with these three sections having their own exclusive columns. If that fails then testing resumes as described.

Normally, the puzzle will be on one page and the solution will be on a second page. However, if the questionnaire permits entering a large amount of data, the puzzle might be so large that the cell sizes and font sizes become unworkably small. In that case, the program may try formatting the puzzle across two pages. It then sets the number of puzzle pages to two and tries again starting with the first (most attractive) formatting factors. Alternatively, it could switch to formatting factors that are optimized for two-page puzzles.

If the questionnaire is that large, it is preferred that the questionnaire also provides an input component such as a checkbox or pull-down list that seeks permission to format the puzzle across two pages if necessary. The predetermined formatting factors should be grouped or marked so that the program knows at what point it should add a page if it is permitted to do so. If it is not permitted to add a page, then it should continue testing with more sets of formatting factors even though the text and cells will be very small.

The formatting of the solution is relatively straightforward. It just needs to fit on a page and it can have much smaller cells because nobody needs to write in them. The preferred embodiment may be enhanced to include an option in the questionnaire or elsewhere for the formatting of one, two or four solutions per page. If one solution per page is selected, the preferred embodiment is for the solution to be in registration with the puzzle grid so that they can be placed one on top of the other and compared by letting light shine through.

Background Pictures, Borders and other Embellishments

Another formatting issue is that the invention usually offers the user a choice of pictures to be displayed with the puzzle. In some cases, these are backgrounds that go behind the grid and clues. In other cases, they may be smaller pictures that go in particular places on the paper or a border that reduces the usable size of the paper. Some of these may create special formatting requirements, such as leaving space for a thick decorative border or images in the corners. To accommodate these conditions, each picture should be stored with an indication of what zones on a paper it reserves for itself, if any. This information is used during formatting by blocking usage of the reserved areas, even if it means overriding the formatting factors wherever there is a conflict. All of this is done transparent to the user.

As will be taught in detail later, the user can browse and choose a picture after puzzle construction. If the chosen picture differs in its reserved zones, the puzzle will have to be formatted again. The invention may permit the user to substitute the user's own images. This also can trigger reformatting, except that background images that don't reserve zones can't affect the formatting.

Normally, a puzzle is first formatted in a portrait orientation. If the user chooses a background picture with a landscape orientation, the puzzle will be reformatted accordingly. Every time the user changes image orientations the puzzle formatting follows. The alternative would be to have the user pick an orientation first and then show images that match that orientation. Either way is acceptable to the invention but the former is preferred so that the user can browse all the images unhampered by what is usually an arbitrary choice.

Most background images provide an advantage to freeform crossword puzzles because the image makes it easy to distinguish lonely unused cells from a used cell. This means that lonely unused cells can be enabled and this improves the options for puzzle construction, sometimes resulting in a more compact puzzle grid with fewer rows or columns. Background images that have large areas of white behind the puzzle grid are still a problem. These white zones may also be indicated with the images so the invention knows to not put lonely unused cells on them without indicating that the cells are not to be used.

The Preview Page

After the user presses the "Finished" button, assuming there are no error conditions, the preferred embodiment of the invention prepares and displays a preview page 60, as shown in FIG. 2. This preview page 60 displays a reduced-size image 62 of the puzzle page. It also provides links 64 to the puzzle and solution, which can be provided in a multitude of ways. The preview page can also report statistics (not shown), such as the number of words in the puzzle and number of rows and columns in the puzzle grid. It can display unrelated advertisements of third parties (not shown). It can offer puzzle formatting options or upgrades that the user can purchase. Thus, it can provide several links to the same puzzle. Each link provides the puzzle in a different layout (aesthetic choice or grade) or in a different file format (for compatibility with the user's software).

To encourage the user to make a purchase, the invention shows the user their puzzle with a beautiful background picture 66. This is shown in the preview window 68, which is a reduced size bitmap that can not be usably enlarged. The user can get an idea of the quality of the full sized version by clicking on a full-size sample link 70 that displays a stock puzzle that is not customized at all.

Alternatively, users can be encouraged to make a purchase by showing them a beautiful puzzle that is deliberately marred in some way to prevent it from being fully useful. Some ways to mar them include, without limitation, omitting or clouding portions of the grid and/or clues, extra indicia indicating the document is a "Sample" or "For evaluation use only," and placing instructions on how to obtain an unmarred version of the document (i.e., make payment). This method can be expected to consume more processor power and bandwidth because of the larger number of custom sample puzzles that have to be generated full-size and transmitted without a purchase.

As the invention can provide for several versions of the same puzzle, it is not necessary that all versions be marred. For many applications it is considered best to provide a simple, unembellished HTML version of the puzzle that is also unmarred and at the same time provide beautiful and embellished versions of the puzzle that are marred until payment is made.

The preferred embodiment of the invention provides for all of these methods of encouraging the user to make a purchase. It is up to the person configuring the questionnaire to make the final decision of which method to use based on demographics, topic, experience, personal preference, availability of processing power and bandwidth, and so forth.

The preview page 60 includes tabs 72 that control which version or grade of the puzzle is shown in the preview window 68. When the user clicks on one of the tabs, the appropriate grade is shown in the preview window 68. The "Premium" grade shows the puzzle with a background image or other, smaller, image(s). The "Plain" grade is the same puzzle without images. The "Web Page" grade is a guess as to what the puzzle might look like if formatted with just HTML. This is a guess because the final formatting will be determined by the user's client software and printer. The "Web Page" grade puzzle may also include an advertisement.

The user may want to make changes to the puzzle, including the clues, answers, title, subtitle, or anything else that is available on the questionnaire. This can be accomplished by clicking on a link 74 that takes the user back to the questionnaire, which will be shown with the user-provided changes still present.

If the user wants to save his work and finish later, the invention provides for a Save link 76 and an Open link 78. The Save link 76 takes the user to a page that asks for identifying information, such as the user's email address. An alternative would be to ask the user to invent an account name. In either case, having the user create a password is also recommended. Obtaining an email address is preferred so that the user may be emailed a link providing easy access to the saved puzzle. The saved puzzle may be opened by clicking on the Open link 78 or on the Login button 80 of FIG. 1A.

The New link 82 provides a way for the user to start over with a new puzzle. The first response should be an opportunity to save the current puzzle, if it is not already saved.

Once a puzzle is saved, all subsequent changes are automatically saved as well. This is implemented by writing the puzzle to permanent storage when the session expires or is closed.

Using Dark or High Contrast Backgrounds

For freeform crossword puzzles, there are various ways to make a puzzle grid stand out from a background image. As shown in the preview window 68 of FIG. 2, one way is to print an opaque white background color to cover the background of the used cells. Actually, printers can't print opaque white, but the printer driver software interprets this command and blocks the printing of the background image in those areas, so no background is printed at all in the used cells. This works well for large images that have little detail, or images that can be recognized even when a significant part of them is blocked out.

A second way to make the puzzle grid stand out is to use a subdued watermark-like background that is visible everywhere, even inside the used cells of the grid. This works best with low-key textures and blurry images that don't have sharp lines. The watermark can be prepared by taking a regular image and fading it by lowering its contrast and increasing its brightness so even its most vivid colors take on a pastel appearance. Sharp edges can be softened by blurring so they don't interfere with the grid lines or the letters that the solver writes in. Alternatively, some images are naturally useful without fading or blurring. These include scenes of snow, sand, clouds, sky, close-ups of light-colored flowers or petals, and any other light, low contrast subjects.

Figure 3:
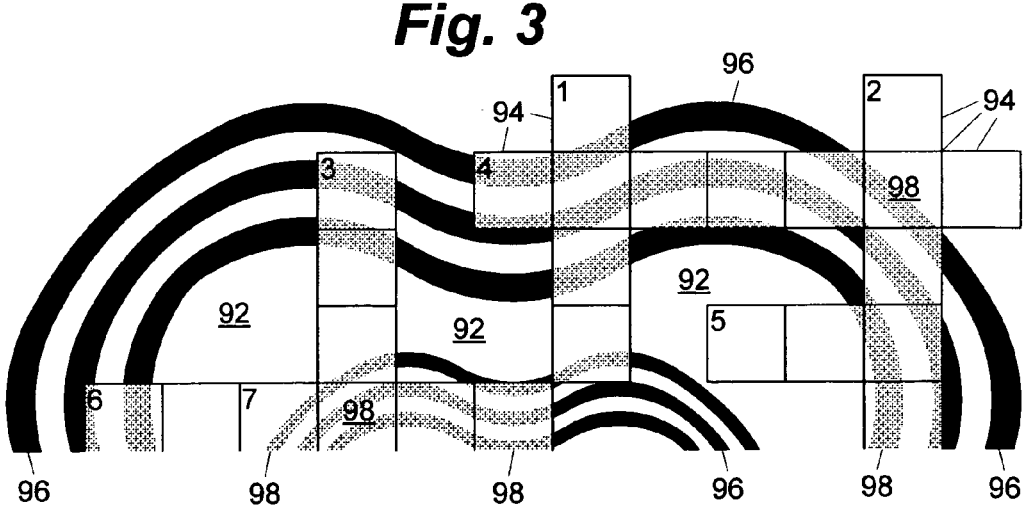
FIG. 3 shows a detailed view of a partially transparent crossword puzzle grid.

FIG. 3 shows a third way to make the puzzle grid stand out. This is to use a combination of the first two ways, in which the space 92 that is not covered by used cells 94 has a rich, non-faded image 96 and the interiors of the used cells continue the image in a watermark-like manner 98. This gives the illusion that the used grid cells are physical squares adhered to a normal picture, and that these squares are made of a milky-white translucent material, that strikes a balance between showing the image and providing a legible writing surface. This third way requires support for drawing with a percentage of transparency. It may not be available for all file formats, but when available it is the best of the three options. Even if it is not available as a file format, it can be achieved by directly manipulating the background image as a graphic, essentially embossing the puzzle grid onto the image and then using the modified image instead of the original.

A full color background image with white or translucent cells can still cause problems for the clues, title, word bank and other matter printed on the page. Ways to avoid these problems include using a smaller, carefully placed image and providing contrast near the text to make the text legible.

To use a smaller, full color image, it should be kept away from the title, clues, word bank and other text. This can be accomplished by putting the image behind the puzzle grid and some surrounding void space only.

To provide contrast near-the text, the part of the image that is near the text can be faded so as to provide contrast for black text. Alternatively, it can be darkened to provide contrast for white text. Only a fraction of an inch around the text needs to be affected, with the outside parts of the affected zone gradually becoming normal in a gradient manner. As a matter of personal taste, the entire clues and titles areas can be affected, or entire lines of text can be affected uniformly without regard to the shape of the letters thereon, or the affected zone can closely follow the shapes of the letters and words.

One of the best ways to lighten or darken the image near the text is to manipulate a copy of the image in the computer's memory prior to writing text on it. Rather than just adding white or black, each pixel should be remapped from the full-contrast domain of the original image to a reduced contrast range. When lightening the area, the reduced contrast range would include white on the light end of the range and a host of mid-level colors on the dark end of the range, such that black turns to a mid-level gray. This would be a gray/white range. Alternatively, when darkening the area, the range would extend from the mid-level colors to black, such that white turns to a mid-level gray. This would be a black/gray range.

The gradient is accomplished by, for example, gradually altering the range from gray/white to black/white. The gray/white range is used under and closest to the black text of the clues. The black/white range is used furthest from the text of the clues. After extending far enough from the text that the range has reached the full-contrast black/white of the original image, the processing need not continue further from the text. This means that a relatively small portion of the image needs to be modified in this manner. By remapping each affected pixel in this manner, the images natural contrast has been compressed into a smaller range, but the details of the image are still visible.

All types of images, even small images, can be implemented as background images with a large amount of white space. This has the advantage of simplifying the program. Standard compression techniques will minimize the additional bandwidth that the white area will require.

Browsing and Selecting Pictures

The user may wish to try other background images for the premium version of the puzzle. This may be done by clicking on the "Browse suggested pictures" link 84 (FIG. 2), which takes the user to an area where many pictures can be conveniently reviewed and selected. The terms "suggested" and "recommended" are used interchangably herein. The terms "pictures" and "images" are also used interchangably herein.

Figure 4:
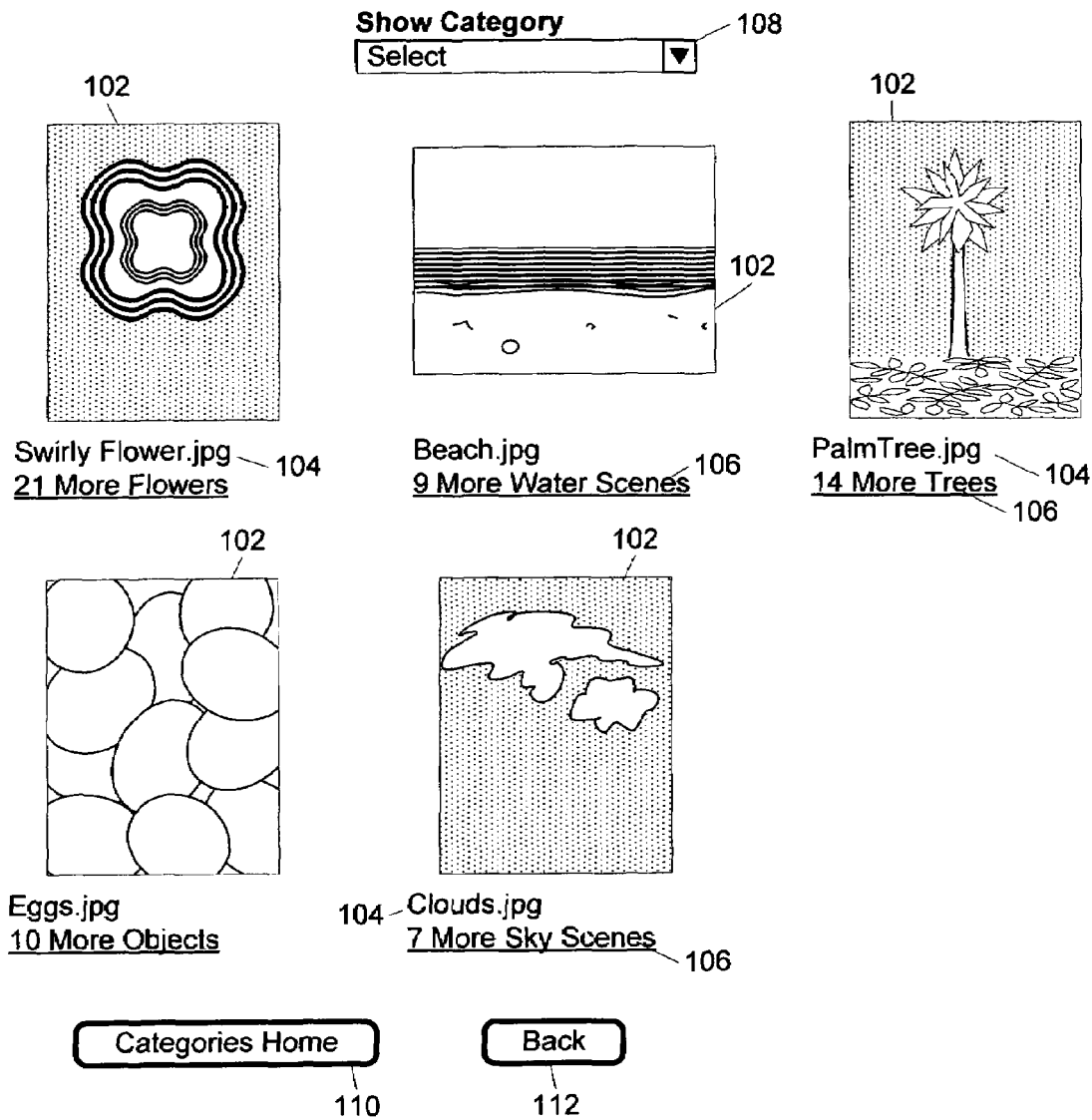
FIG. 4 shows a page for browsing suggested or recommended images.

FIG. 4 shows the main page of this area, the "Browse Recommended Pictures" page 100. This page 100 shows several thumbnails 102, one from every category of images that has been previously configured. The user may at any time select an image by clicking on it's thumbnail 102 and thereby return to the Preview Page 60.

Below each thumbnail 102 is the name of that image 104. The name 104 is intended to provide an opportunity to be descriptive. Below each name 104 is a link 106 with the anchor ". . . More . . . " where the ellipses represent and are replaced by the number of other images in the category and the category name, respectfully. Clicking on the "More" link 106 opens up the entire category of the clicked thumbnail 102. Another way to open up a category is to pull down the "Show Category" selection box 108 and select the category directly. The items in the selection box 108 may also indicate the total number of images in each category, which would be one higher than the "More" links 106 show. Showing the number of images in each category is preferred because it gives the user an idea of the download time for the page.

When a category is selected, the "Browse Recommended Pictures" page 100 shows thumbnails 102 of all the images in the selected category. Because all shown thumbnails 102 are now members of the same category, the "More . . . " links 106 are not present. However, the "Show Category" selection box 108 is still there and functional. The "Categories Home" button 110 takes the user back to the view of one thumbnail from each category. The Back button 112 takes the user back to the Preview page 60 without changing pictures.

These pages show as many thumbnails as there are categories or pictures in a category, so each page will be of different length for each category and configuration. These pages can be dynamic (created when the user clicks) or static (created in advance when configuring the categories); it does not matter.

The invention can also accommodate categories that are further subdivided into subcategories. However, this is not required for the preferred embodiment because the topic of the puzzle already provides a category of sorts, so what is described here as a category is already some sort of subcategory of the puzzle topic. Another reason is that the end user can also search the entire database of images.

FIG. 2 shows a link 86 that lets the user search the entire database of pictures. This database is broken down into many more levels of categories and subcategories than the recommended pictures. This database can be searched using standard search methods using queries on the picture name or description. It is preferred that each image in the database be described as to its contents.

Optionally, for the most sophisticated uses of the invention, the descriptions are composed of keywords that are grouped according to how prominent the item is in the image. For example, the description would contain fields for the prominent theme, main items, easily visible items, obscure items and prominent colors. Thus, for example, a picture of a beach at sunset may be described as follows: (Prominent theme) beach, sunset; (main items) sand, water, ocean, sky, sun, clouds; (other items) people, toys, sand castle; (obscure items) birds; (prominent colors) red, orange, yellow, blue. This type of description will help make sure the proper pictures come up in a search and it will also help sort the pictures according to prominence of the item(s) sought.

The Final Output of the Puzzle and Solution

Referring again to FIG. 2, the links to the puzzle and solution can be separate links to HTML pages that contain a draft-quality puzzle and solution. On the other hand, the link to the draft-quality solution can be on the draft-quality puzzle page itself. The latter method is how the single Show link 64 provides access to both puzzle and solution.

HTML pages tend to print with extraneous indicia on them, including page number, page title, uniform resource locator and date. Even if the browser is configured to not print the extraneous indicia, it is difficult to format an HTML page so that it prints with excellent quality reliably across many operating systems, browsers and printers. Because of these problems, the preferred embodiment and configuration of the invention gives HTML or "web page" grade puzzles away for free, with an advertisement on them.

The invention provides for higher quality or grade of output after purchase, which is accomplished by clicking on one of the Buy links 90. These links could as well be "add to cart" links. The Buy links 90 take the user to a series of pages (not shown) where they are presented with the option to order printouts that are professionally printed and mailed, where they can confirm the total and pay by credit card or other forms of payment. Whether or not the user orders any prints, the invention also provides the puzzle and solution in a form that prints with excellent quality on a wide variety of user equipment.

After payment, as shown in FIG. 5, they are returned to a modified preview page 120. This page still allows them to change the puzzle and picture, as shown in the puzzle section 122 and background section 124. The main difference is that it provides a final printing section 126 with a conspicuous "CLICK HERE TO PRINT" link 128 or button. In the preferred embodiment, this link 128 is boldface red. The reason the link 128 or button is so conspicuous is so that buyers know that the page has changed and what to do next, while still providing much of the functionality of the previous preview page 60 in a familiar way.

When the user is ready for printing, a click on the "CLICK HERE TO PRINT" link 128 causes the invention to prepare the final output file, such as an Adobe PDF electronic document. For puzzles with pictures, this can be somewhat demanding of processor time because a full-size background image is involved, which typically will contain several million pixels of full-color picture information. This is much more computationally intensive than the reduced size preview of the image. It is even worse if the image has to be extensively modified, pixel by pixel, to provide for partial transparency of the grid and darkening or lightening around the text.

After the PDF file or other electronic document has been prepared, a download or display link (not shown) is provided on a either a separate page or as an addition to the Final Printing section 126 of the modified preview page 120.

For document file formats that support page breaks, the invention puts both puzzle and solution on separate pages in one document file. This helps keep multiple versions of a puzzle and solution from being confused. For purchases of a puzzle with picture (the premium grade), the same electronic document also includes a plain copy of the puzzle (without picture). This is a convenience to the user as the plain puzzles photocopy well on common photocopy machines.

The ways in which the puzzle and solution can be provided to the user include a printer-ready electronic document such as an HTML file with the graphics files that it references, Adobe Portable Document Format (PDF), a Microsoft Word document (DOC), and any proprietary puzzle file format. Other formats that can be optionally provided include Graphic Interchange Format (GIF), JPEG, TIFF, Scalable Vector Graphics (SVG), Windows Metafile Format (WMF or EMF), and many others. The HTML version is preferred for free puzzles and the PDF version is preferred for marred and paid puzzles. The proprietary puzzle file format is provided so the user may download the puzzle (formatted or not) and download custom software that can print the puzzle on the user's printer.

An optional feature of the preferred embodiment allows the user to direct the computer to convey (such as email) the puzzle to a third party printing service. It can be conveyed as a printer-ready electronic document such as an Adobe Postscript or Encapsulated PostScript (EPS) file (preferred) or in a proprietary puzzle file format together with software to print the puzzle.

The puzzle may be used electronically in several ways. Under direction of the user, the computer can prepare a puzzle file for use with an online interactive puzzle playing program or applet. Such a program or applet and puzzle file can be placed on a website for interactive solving by one or more people. Also, the user can direct the computer to email the puzzle to a friend for interactive solving.

Still another way the puzzle may be used is by giving the user the option of having the web server print (or direct the printing of) the puzzle on a printer near the server, together with mailing information so that the puzzle can be mailed to the customer. This works well for people who don't have a suitable printer, want the puzzle printed on special paper or want other services such as rolling and tying each puzzle with a ribbon.

Other Types of Puzzles

FIG. 9 shows a word search puzzle 160, which is another puzzle that can be created by the invention. It has a two-dimensional array of letters 162 in which words are hidden. The hidden words are usually provided in a list of words 164.

The questionnaire for a word search puzzle would simply be a list of suggestions for words to include, with the questions or suggestions not showing up at all in the final puzzle.

Alternatively, (not shown) the questions could show up in place of the list of words 164, with each question accompanied by an underlined blank area. The underlined blank area is provided for the puzzle solver to write the answer to the question. Then the puzzle solver is to find the answer in the array of letters 162. A consequence of this alternative is that the puzzle solver can verify that the answer is correct and get suggestions for hard questions by searching the array of letters 162 for possible answers.

FIG. 10 shows the solution 170 to the word search puzzle 160 of FIG. 9. The hidden words are circled 172.

Another puzzle the invention may also be used to prepare is the Cryptographic Guessing Game disclosed in U.S. Pat. Nos. 5,388,043 and 5,479,506, both to Rehm.

The Invention as a Customizable Website

The preferred embodiment of the invention is as a website or web service which can be accessed from other websites. Each of these other websites can provide its own unique custom configuration for how they want the invention to function.

The invention may be provided with stock themes for common holidays and events. Each stock theme would have theme-related questions and a set of theme-related images for the user to choose from.

A webmaster who is signing up to make the invention available on his or her website just needs to pick a theme and perhaps indicate some colors to make the invention match the referring website. Then the link is ready to go live. For example, a webmaster of a Valentines Day web site could just indicate that a stock valentines theme is to be used, benefiting from the questions and images that are provided with the invention.

A webmaster of a website that has no matching theme could choose a special mode of the invention in which the themes or topics are changed according to the season. Example themes include most holidays and other events that happen more often at certain times of the year, such as graduations. Because of differences in local or religious practices, the webmasters can disable certain topics from showing up on his website.

However, according to the preferred embodiment, the webmaster could also exercise greater control over the operation of the invention. Certain configurations can be established by the webmaster of the referring website. These webmaster configurations include the look and feel of the questionnaire (colors), the text of the questions that appear, which questions appear in static text and which as preloaded input fields, how many open input fields are provided for additional question and answer pairs, the maximum character lengths of the questions and answers and other fields, the number of lines of title and subtitle that are allowed, the types of output that are available to the user and at what costs if any, what type of marring is used for unpaid premium puzzles, what stock themes (images) are available to the user, whether the user can substitute user images, etc. For example, some webmasters may want to block all free puzzles.

Thus the theme of the puzzle may be provided by the invention website or by the referring website or both. The questions may be provided individually or the configuration may indicate that one of several predetermined stock topics is to be used together with its prepared stock questions and other configurations.

The invention may restrict certain webmaster configurations so that, for example, a website can not provide all of the invention to everyone for free.

The invention also permits the referring website to configure certain user options. User option configurations determine whether the user is presented a choice of certain options and what the default choice is. If the user is not presented the option, then the default choice is always used. If the user is presented the option, the default choice is preloaded into the input field that is presented to the user.

These user option configurations include the following options (with the preferred place at which they are presented): the stock theme (before the questionnaire), the puzzle type (before the questionnaire), the page orientation (questionnaire or preview or browsing of pictures), the maximum number of puzzle pages (questionnaire), the title and subtitle fonts (preview), the clues or word lists fonts (preview), whether there is a preview page, whether separate windows are launched for the puzzle and solution, number of solutions per page (preview), etc. For crossword puzzles, these user option configurations include whether lonely unused cells are permitted, whether a word bank (list of answer words) is provided on the puzzle page and the format of the word bank.

The stock theme can be a user option because the invention provides for a "topics for other occasions" selection box 50 (FIG. 1A) that lets the user override the webmaster's default choice of topic. This selection box 50 will display the entire list of stock topics that the webmaster permits in the rotating topics, even if the rotating mode is not used.

The invention also provides for default configurations in case a fixed or user option configuration is not provided. This makes configuration easier for webmasters and directs them to the best options. For example, output options that are enabled by default may include free HTML puzzles, and premium proprietary puzzle files, premium Adobe PDF and Microsoft Word documents. Output options that are normally disabled by default may include web server printing whether or not the puzzles are rolled and tied with ribbons.

Linking from Other Websites

The invention may permit other websites to link to it in a variety of ways. The easiest is merely an ordinary link. If the referring website's owner desires to receive some kind of reward or royalty for the referral, it is necessary for the invention to keep track of where referrals came from and what sales resulted from these referrals. This can be done in any of several ways that are well known in the art, including looking at the referrer field that accompanies most web requests. However, certain types of privacy software blocks this referrer field.

The preferred way is for the link to include a query or arguments with several name and value pairs. One such pair would establish the webmaster and another would establish which of the webmaster's configurations to use, if there are more than one.

Optionally, the referring website may put the invention web pages inside a frame in the user's browser. The other frames are under direct control of the referring webmaster and so it looks to the user as though the invention resides on the referring webmaster's website.

Signing Up Third Party Websites

According to the preferred embodiment, the invention can be provided in a way that requires a third party website to sign up or register to become an affiliate. The advantage of this is that the various configuration options can be established in a secure member-only area and do not have to be communicated back and forth with each puzzle made. For example, it would be enough to for the referring web site to provide its member identification in the referring link, whether that link be a query in an HTTP GET operation or a field in an HTTP POST operation.

An alternative to signing up third-party websites is to provide the invention to anyone without prior sign up, just by processing HTTP GET or POST operations that come with all necessary configuration information as part of the query or fields. If this method of linking is enabled, an optional tool should be provided to help prepare an HTML link with the appropriate query or an HTML form with the appropriate hidden fields. The configuration information in the link or form can at least have some of the most basic configuration choices such as puzzle type, stock puzzle theme, and so on. If the referring site wants royalty payments, the configuration options should include the user's "payable to" name and mailing address, or email address if the user prefers receiving royalty payments via an email address. It is easy for the web server of the invention to compare the various names and addresses and consolidate multiple royalty payments or rewards into periodic payment, all without any account numbers or registration process. Should it be necessary, it is also still possible to block from further use any web site who has abused the invention. This blocking can be accomplished by detecting the referring site, the Internet Protocol (IP) address of the referring site, the name and address information of the royalty or reward payments, or other identifying information that can be extracted from such an HTTP GET or POST operation.

The Webmaster's Configuration Area

According to the preferred embodiment, in which webmasters sign up in advance, FIG. 11 shows the main configuration page 180 of the Webmaster's Private Area. This main page can be thought of as the home page after login is complete. This area is where configuration options are presented and set.

All pages of the webmaster's private area show the account identification 182 of the person that is currently logged in. They also have a logout button 184.

The main page shows the webmaster's contact information summary 186 and a change contact information link 188. It also shows the latest announcements 190 and a view all announcements link 192.

The main page shows the number of sessions 194 that are currently active that are using that webmaster's configuration(s). It shows an activity summary 196 giving a summary of recent activity for the webmaster's configuration(s). There is a view details link 198 for getting details of the current activity (for which no payment has been made). There is a view archive link 200 for getting details of past payment periods.

The heart of the main configuration page 180 is the configuration selection box 202. A webmaster merely has to choose a configuration in this box 202 and then press the "make a link to it" button 204. After pressing this button, the webmaster will be presented with a link that can be copied and pasted onto any web page. The link may be given in several forms, including the target url, an anchor field with the href parameter pointing to the target url, or even a one-button form with the action pointing to the target url. The target url will look something like this:

http://www.mypuzzlemaker.com/?id=1234;
config=rotating+seasonal

The configuration selection box's 202 default setting (shown) is "Rotating seasonal (freeform crossword)." This means that a new webmaster signing up but not making any configurations will be offering valentines puzzles leading up to Valentines Day, puzzles honoring their mothers leading up to Mothers Day, and so on to Christmas puzzles leading up to Christmas. If the webmaster presses the Edit button while this default configuration is selected, a list of all the potentially rotating stock themes will be presented. Each theme will have a checkbox by it. The webmaster may check and uncheck themes in order to customize the rotation. Only the rotating seasonal configuration behaves this way. If the webmaster picks configurations for more than one puzzle type then the indication "(freeform crossword)" will be changed to "(mixed types)."

The Rename button 208 and Delete button 210 are not available to rename or delete stock configurations. They are available to the webmaster only to rename or delete his own configurations.

The webmaster can create his own custom configuration in two ways. The first is to press the New button 212, which will establish a blank configuration, one without any questions or clues and standard defaults. The other way to create a custom configuration is to select any existing configuration in the configuration selection box 202 (except rotating) and to press the Edit button 206.

With either method of creating a new configuration, a Create New Configuration page 220 will appear, as shown by FIG. 12. The webmaster then invents a name and types it into the New Configuration Name box 222. The Puzzle Type selection box 224, when pulled down, shows the puzzle types that are available to webmasters. Entries may include, for example, "freeform crossword," "Fully-crossed crossword," "word search," "cryptographic" and others. The webmaster's choice will determine the style of questionnaire and other options that are available when editing the configuration.

Optional to the invention, in the event the webmaster pressed the New button 212 without understanding the function of the Edit button 206, the webmaster can be given a second change to base the new configuration on an existing one.

This is done by selecting a configuration from the Optional selection box 226 before pressing the Create button 228. The Optional selection box 226, when pulled down, shows all non-rotating stock and custom configurations.

After a new configuration has been created, its name is added to the members listed in the configuration selection box 202 (FIG. 11). Preferably, custom configurations are added at the top, above the stock configurations. Also preferably, the stock configurations are all visually marked as being stock configurations. Simply starting each name with the word "Stock" would suffice. By starting each name with a punctuation mark that sorts after "Z" the entire list can be kept alphabetized for easy access and separation.

The next page to show after pressing the Create button 228 is the edit configuration page 230. Another way to get to this page is to select any non-rotating configuration in the configuration selection box 202 (FIG. 11) and press the Edit button 206.

The edit configuration page 230 shows the name 232 of the configuration being edited. A Save button 234 is provided for the webmaster to save his work. Changing tabs 236 also performs the save function.

The edit configuration page 230 has a variable area 238 that is controlled by a row of tabs 236. The variable area 238 does not literally have to be a separately changeable portion of one page, but rather it can be implemented as several distinct pages in which the top portion is always the same (including, for example, items 182, 184, 232 and 234). The configuration options in these variable areas are largely self-explanatory. This makes it easy for new webmasters to customize their configurations without referring to a users manual.

Configuring the Questionnaire

In FIG. 13A, under the Questionnaire tab 240, the webmaster can set the banner 36 (FIG. 1A) of the puzzle maker by typing in the banner text edit box 242 or populating the image file edit box 250 by browsing 252 his computer's hard drive and uploading the image file 254.

The webmaster can modify the text under the banner 38 by changing it in the edit box 256. The instructions 40 can be changed using the instructions memo field 258.

The webmaster can control the prompt for the title 41 and the prompt for the subtitle 43 by changing the defaults in the appropriate edit boxes 260, 262. For example, the webmaster may want to get more specific by prompting for "Couple's names" and "wedding date," respectively.

The suggested clues memo field 264 is where the webmaster customizes the questionnaire's questions or clues 12 for a freeform crossword puzzle. Only the questionnaire and other options for freeform crossword are shown in the figures. With this teaching, configuration options for the other types of puzzles will be readily apparent to those skilled in the art.

In the suggested clues memo field 264, it will normally be sufficient to simply list clues one clue per line 266. If some clues are so long that they wrap to the next line, the webmaster may wish to skip lines between the clues to clearly separate them. The invention ignores skipped lines. Unlike short questions 20, when a long question (not shown) is displayed on the questionnaire 10 (FIG. 1A), it should be displayed in a multi-line memo field that is as large as necessary so the whole question can be read without scrolling.

The suggested clues memo field 264 is capable of specifying special effects, should they be required. For example, to specify a clue or question can not be edited by the user, the clue should be enclosed in curly braces 268. Then the non-editable clue will appear in as a static text field 18.

Alternate clues that are to appear in a selection box can be listed on one line (which may wrap), with the clues separated by double semicolons like this: "His favorite color;; Her favorite color".

Other options are shown 270 under suggested clues memo field 264. The webmaster can get all the details and examples by clicking on the "more help" link 272.

When the webmaster is finished configuring the questionnaire portion, the preview questionnaire button 274 will show them a questionnaire 10 configured as specified. This can be shown in a separate pop-up browser, or if in the main browser, then the browser's Back button can return the webmaster to the configuration area.

Configuring the Preview Page

Clicking the Preview tab 280 causes FIG. 13B to appear in the variable area 238. Here the webmaster can configure most everything that shows up on the preview page 60 (FIG. 2). The text in the various edit boxes and memo fields is the default text. Most webmasters will not need to change it. Giving this much flexibility to the webmasters is optional to the invention.

The price of each grade of puzzle may be shown or not shown on the preview page 60, depending on the "show price here" checkboxes 282.

The "Change sample" link 284 takes the webmaster to a page (not shown) where a custom sample puzzle can be uploaded. If desired by the provider of the invention, it may also have a checkbox that if checked means that the user's current puzzle becomes the sample puzzle. Of course, for it to be a sample and not the final product, it will have to be marred in some way, such as in one of the ways disclosed herein. Providing this capability is not ordinarily recommended because of the extra processing time and bandwidth this requires. A dynamic sample can require extra bandwidth when a user looks at multiple versions of their puzzle. A static sample would have to be downloaded only once.

The preview page can itself be previewed by clicking the "preview this page" button 286.

Configuring the Recommended Pictures

Clicking the Images tab 290 causes FIG. 13C to appear in the variable area 238. Here the webmaster can choose which stock images are related enough to the theme to recommend. He can also upload some of his own images. Finally, he can set the order or sequence in which to recommend them. This page is mostly self-explanatory.

In the "Our stock images" tree view 292, the book icons 294 indicate a category of categories. These can be expanded by clicking on them. The page icons 296 indicate there is not another level of categories.

When the webmaster clicks on a category that has a book icon, another page (not shown) appears. This page shows thumbnails of all the images in that category. Each thumbnail has an Add button or checkbox by it, so that the webmaster merely has to click to add the image. Each image name appears below its thumbnail. At the bottom of this page is a Done button that returns the webmaster to the page of FIG. 13C, which now has the added images listed in the "Images you recommend" memo field 298, which is scrollable but not directly editable as text.

If the category has only one picture in it, then this picture appears in the "Image Preview" window 300, where it can be added by pressing the Add button 302.

If the user click on the "Upload images" link 304, a page appears (not shown) where the images can be specified and uploaded. Each image that is uploaded is added to the "Your pool of uploaded images" tree view 306. This tree view 306 has no expandable nodes. It is a tree view only for consistency in operation.

The invention only requires full-size images, which can be of any adequate resolution. It generates and manages thumbnails automatically. It also determines whether the images are in portrait or landscape orientation automatically.

To avoid repeating uploads of the same image, the images listed in the pool 306 are available to all of the webmaster's configurations, just like the stock images. To make them available in the configuration that is being edited, they need to be added just like the stock images. This is done by clicking on one of them, which loads its thumbnail into the Image Preview window 300, and then clicking the Add button 302.

After all the recommended images have been added to the "Images you recommend" memo field 298, the webmaster should press the "preview and arrange" button 308. This button calls up the "Organize Recommended Images" page, shown in FIG. 14 and discussed below.

Configuring Colors

Figure 13D:
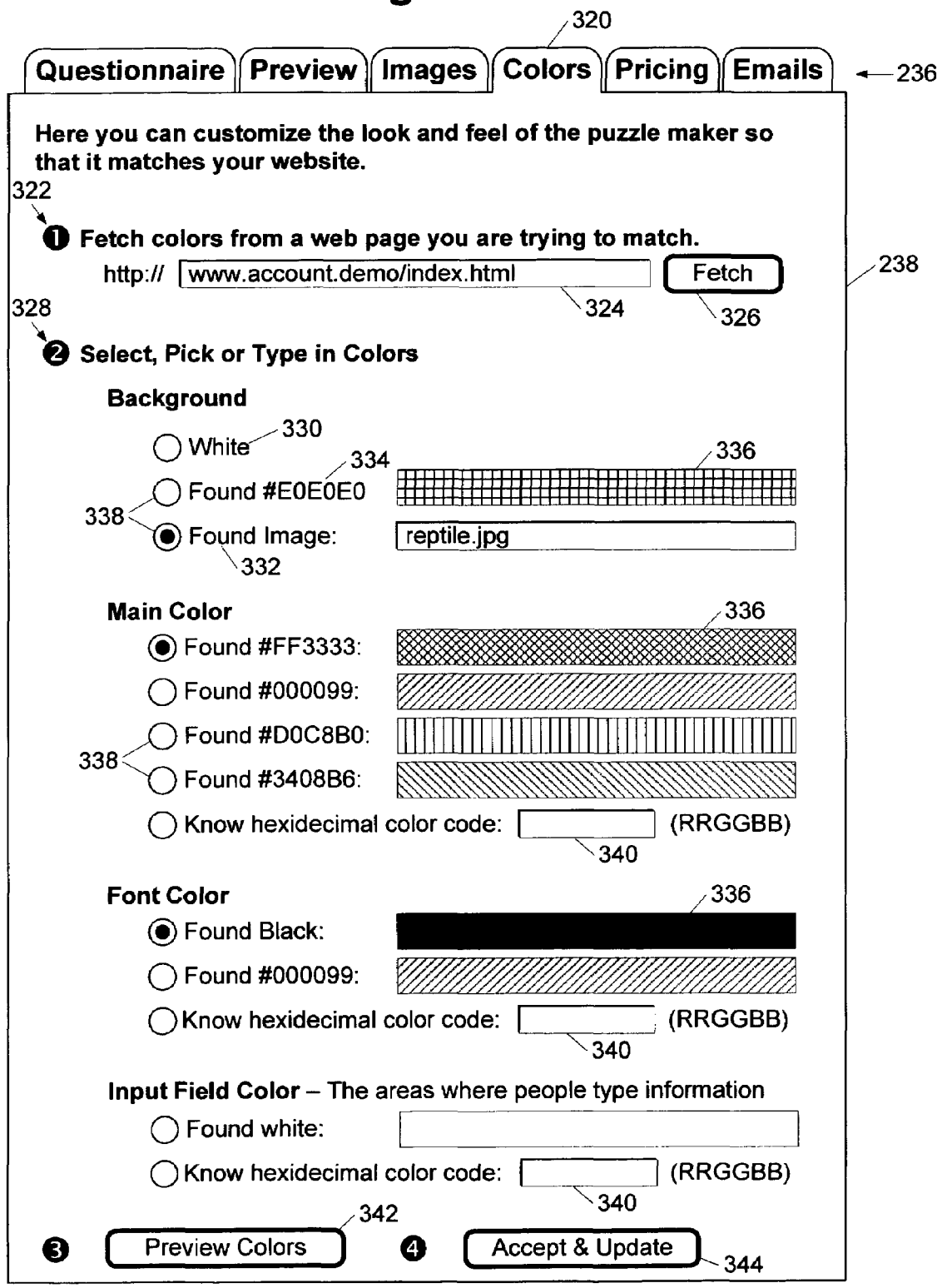

Clicking on the Colors tab 320 causes FIG. 13D to appear in the variable area 238. This is expected to be one of the most commonly used configuration pages.

First, in section one 322, the webmaster types the referring website's URL into the URL edit box 324 and presses the Fetch button 326. In response, the invention fetches the web page and analyses it, looking for a background image and color codes of various types. Whenever it finds a color code, it adds this to the appropriate part of section two 328.

In section two 328, some options are always provided, such as the choice for a white background 330. Options that are there because a color was found in the analysis are indicated with the word "Found" 332, the color's hex code 334 and a color sample 336. The webmaster clicks the radio button 338 of the desired color choice in each part of section two 328.

If the desired color was not found, or if the webmaster wants to pick a unique color, the unique color's hex code can be typed into the appropriate hex code field 340.

When the colors have all been entered, the webmaster can click on the "Preview Colors" button 342, which causes a questionnaire page with the custom colors to be shown in the same or another browser. To accept the result, the webmaster clicks the "Accept & Update" button 344.

Configuring Pricing

Figure 13E:
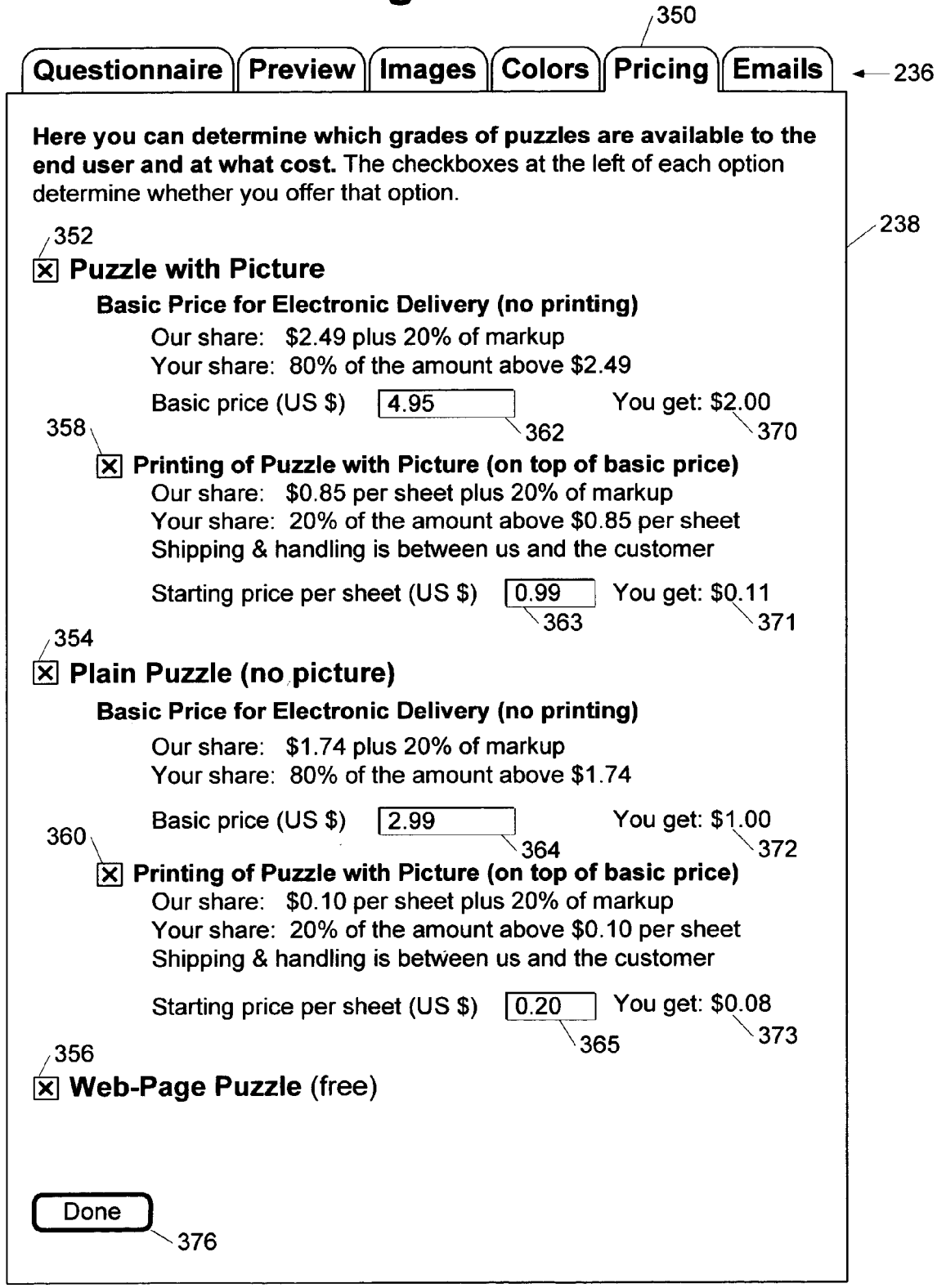

Clicking on the Pricing tab 350 causes FIG. 13E to appear in the variable area 238. This page also controls which output options are offered. Default values are shown.

The leftmost checkboxes 352, 354, 356 determine whether the indicated grade of puzzle is mentioned on the preview page 60.

The other two checkboxes 358, 360 determine whether the user is offered a printing and mailing service. This service is performed by the provider of the invention and not the webmaster. The state of these checkboxes matter only if the corresponding grade of puzzle is even offered.

The webmaster is free to change the price charged for the various grades of puzzle. When the amount in the amount edit box 362–365 is changed, the corresponding "You get"

amount 370–373 is immediately updated. This lets the webmaster play with various pricing ideas.

At the option of the provider of the invention, either the "You get" amounts 370–373 may not be negative, or if they are negative, then the webmaster must have sufficient funds in the account to cover the cost of the deficiency. The latter option allows a webmaster to offer free puzzles to others.

The Done button 376 is redundant because it does the same thing as the Save button 234 (FIG. 13A). It is provided for consistency.

Configuring Emails

Clicking on the Emails tab 380 causes FIG. 13F to appear in the variable area 238. This page controls which emails are sent by the invention, when, and what the emails say.

Because of the potential for abuse of email, with spammers always looking for ways to hijack other people's servers and bandwidth, changes on this page must be reviewed by a human before the changes are activated.

The checkboxes 382 determine which emails are sent. The number of days edit boxes 384 indicate how long to wait after an event. The subject text boxes 386 and body memo fields 388 allow for customization of the email.

The subject and body text may include variable fields such as "<PuzzleTitle>," "<PuzzleLink>," "<Invoice>," "<PurchaseDate>," "<CustomerName>" and others for customizing the email message.

When finished customizing the messages, the webmaster clicks the "Submit for Approval" button 390.

Organizing Recommended Images

Figure 14:
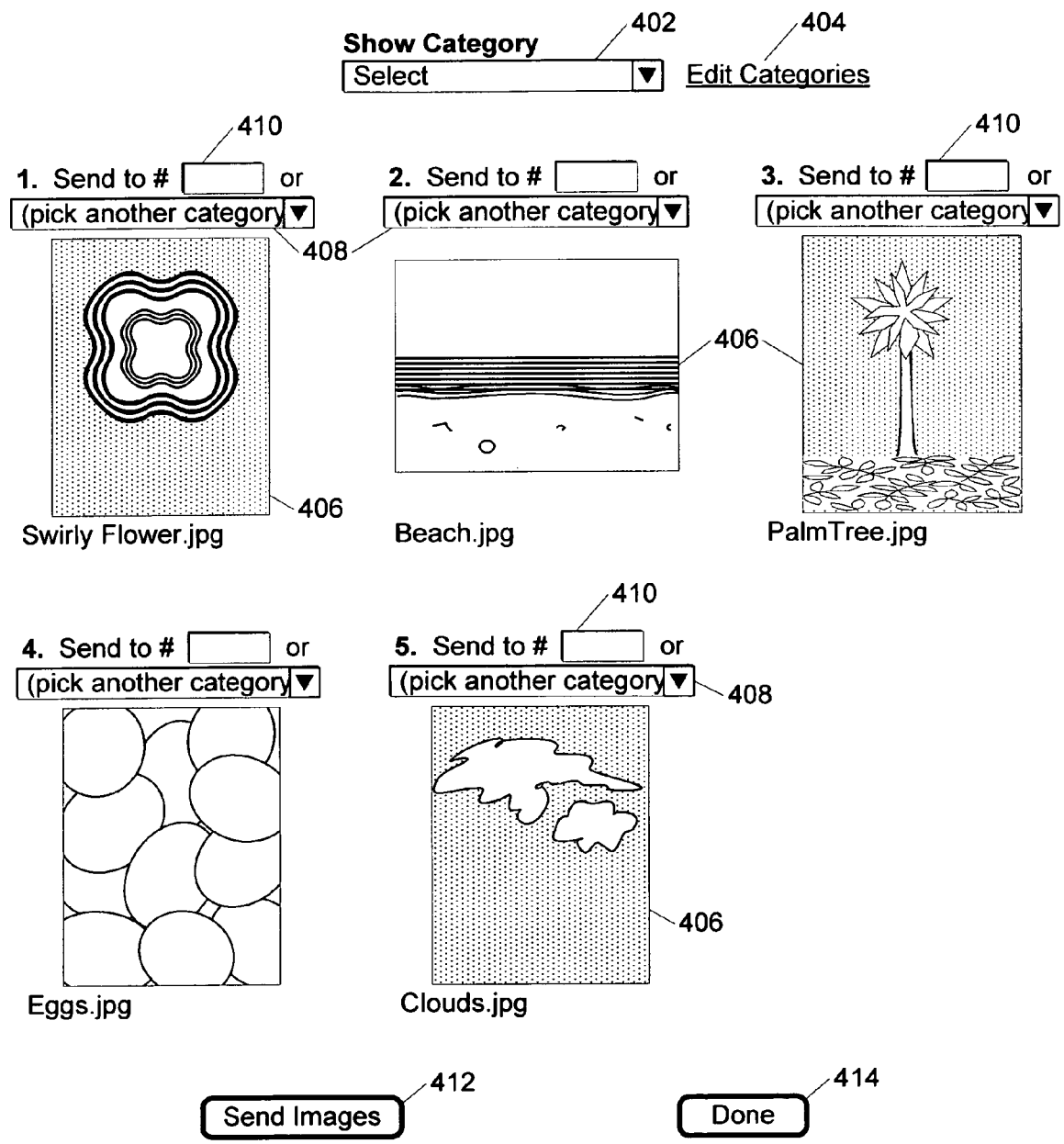
FIG. 14 shows a page for organizing recommended images into categories and then into a sequence within each category.

Referring back to FIG. 13C, after the webmaster clicks on the "Preview and Arrange" button 308, the invention displays the Organize Recommended Images page 400 (FIG. 14). This page allows the webmaster to organize the recommended images into categories and then to set the order in which the images are to appear within each category.

If this is a new blank configuration with no prior recommended images, then all the images listed in the "Images you recommend" memo field 298 (FIG. 13C) appear as thumbnails 406 in the page of FIG. 14. (The examples shown don't correspond.) The "Show category" selection box 402 has no items in it. It may be blank or may say "no category."

The user could leave the images alone, essentially keeping them in random order in one default category.

However, it is recommended that the webmaster should click the "Edit Categories" link 404 and create some categories by simply inventing and listing the category names in a memo field (not shown). These category names become the pull-down contents of the "Show Categories" selection box 402 and the several "send to" selection boxes 408 on the page. They may also each have a "No category" entry available, which acts like a default category for newly recommended images.

After establishing some categories, the webmaster sends each image to a category by picking the appropriate category name in each thumbnail's 406 "send to" selection box 408.

Optionally, the webmaster can also type a number in the sequence edit box 410 by one or more thumbnails. Each category uses a separate numbering sequence starting with the number one. Typing in zero will remove the image from the list of recommended images. It is okay to skip numbers at this point. The relative sizes of the numbers will determine the initial sequence. If no numbers are entered then the initial sequence is undefined.

The next step is for the webmaster to press the "Send Images" button 412. The invention then organizes the images in categories and possibly a sequence, as desired.

At that point the webmaster may be finished or may want to examine each category individually. This is done by selecting the category to examine in the "Show category" selection box 402. When the category appears, all the images in that category will be shown among the thumbnails 406. If necessary, the webmaster can still send an image to a different category.

It is more likely, however, that the webmaster will merely want to resequence the images. The images are shown in this tool in the same arrangement and order that they will be shown to the end user on the "Browse recommended pictures" page 100 (FIG. 4). Therefore, this is a preview of what the end user will see.

The sequence edit boxes 410 also work as follows: Typing in a number that is greater than the number of images in the category will place that image at the end, unless an even greater number is used elsewhere. Typing in a number that is within the number of images in the category inserts the image at the position and bumps rest over. For example, the number three will make the image the third image in the category and the old number three image becomes the number four image.

The webmaster presses the Send Images button 412 again to resequence each category. Because the thumbnails are always the same and should be cached by the web browser, the page updates should occur relatively quickly.

When adding recommended images to an exiting category structure, the existing images are first place in the "no category" category. Then they can be moved from there.

If there are images in the "no category" category when an end user wants to select an image, these images appear in FIG. 4 after the images that are part of a category. They appear without a "More" link. This is an acceptable way to handle unique images that just don't fit in a category.

When the webmaster is finished rearranging the images on this form, the Done button 414 can be used to return to the configuration editing screen, under the Images Tab 290.

The Invention as Software

The invention may also be provided as a software program that can be downloaded or otherwise distributed on removable electronic media such as floppy discs, zip discs, CD-ROMS, DVDs, flash memories, etc. In this preferred embodiment, the invention may proceed as described above if the software was customized only for a particular topic. Otherwise, if the software was not customized for a particular topic, the invention first presents to the user a choice of many topics. Each topic leads to a questionnaire that is appropriate for that topic. Then the invention proceeds as described above, except in a stand-alone manner. (This method of selecting topics corresponds to how some websites may wish to present the invention.)

As with the website embodiment of the invention, some or all of the formatted puzzles are marred until a payment code is entered into the program. The payment code may enable the unmarred printing of a particular number of puzzles or for a particular time or for ever, depending on what privileges the user purchased. The privilege level is encrypted into the payment code. It is advantageous if the user's name is also encrypted into the payment code so that the software can not be unlocked without also typing in the user's name. This discourages users from sharing their payment codes, since such sharing can so easily be traced to its source.

Only a limited number of images will fit on a particular kind of media. Thus, the publisher of a software version of the invention may have more images than fits on the best type of media to use. Downloading the rest is an option, but consumes a lot of bandwidth. The preferred way of solving this problem is for the media to include a few of the most popular full-size images and provide thumbnails of the rest, with links to a place where the full images are available for download. This makes it possible for the user to browse the images quickly and download only the particular image that is needed. The user's payment code may be encrypted and passed to the server to authorize access to the full-size image.

The invention may also be provided as an applet that tuns inside a web browser. It can also be provided so that it runs in other types of computing devices such as a PDA, tablet PC, notebook computer or a kiosk with any of these computing devices or an Internet connection to one.

Single Puzzle Purchases

The preferred embodiments of the invention, both the software and website embodiments, allow the user to purchase single puzzles and still retain much flexibility to modify the puzzle at any time. This is accomplished by saving the proposed finished puzzle and certain identifying customizations of the puzzle to a file. The file should be in a proprietary puzzle file format. The save is done at the time of purchase and the identifying customizations are locked so that they can not be changed by the user after the time of purchase. In the preferred embodiment, the identifying customizations include the answer words and the puzzle title. The manner of locking can be merely that they are encrypted, but it is preferred that the identifying customizations be saved as plaintext along with an encrypted checksum.

When subsequent changes are made to the puzzle, the changes are saved as usual but the identifying customizations and their encrypted checksum are not updated or otherwise altered. They are saved as they were when the purchase was made. At certain times, such as at least when the puzzle is to be printed or exported, the invention checks to make sure that the puzzle identity has not changed. This is done by first verifying that the identifying customizations have not changed. If they have not changed, then the current state of the answer words and title is compared to the identifying customizations. If a predetermined minimum percentage (e.g., twenty percent or fifty percent) of the answer words in the identifying customizations still appear in the current answers and title, then the puzzle is deemed to be the same puzzle and it will print and export unmarred. Otherwise, the user will be informed that the changes to the puzzle are too great. The user should also be told something like "Your puzzle must have six of the following twelve words for it to be considered the puzzle you paid for." This is followed by a list of the words in the identifying customizations.

It is preferred that this puzzle identity check be performed whenever the answer words change so that the user does not waste time perfecting something that can not be printed. In the event that the identifying customizations do not match their encrypted checksum, the invention displays an error message that informs the user that the puzzle file was corrupted. This method of limiting the purchase to one puzzle while providing flexibility for minor changes has the advantage of being a distributed solution that does not require a single server to manage it.

A still more preferred method of limiting the user to a single puzzle is to keep track of payments on a single server and to record the identifying customizations and checksum only when the finished puzzle is actually used for the first time. Thus, after purchase, the user can make as many modification to the puzzle as he or she wants. The user can even purchase a puzzle first, without having made any customizations. The identity of the puzzle is fixed only when the user declares it finished by printing, exporting it, or otherwise using it. If the user makes post-use changes and tries to use it again, then the state of the puzzle is compared as described above.

With either method, tiny puzzles (one to three or four words) should be ignored because users often create these to test or become familiar with the process before they go through the process of making their real puzzle.

Configuration Refinement Tools

According to the preferred embodiment, the invention automatically keeps track of which suggested clues are used most often and which recommended pictures are used most often. This information is available to each webmaster on a per-configuration basis. The webmaster can use it to improve the sequence of the questions and pictures so that popular ones are seen first. The webmaster may also use it to know which unpopular questions and pictures should be dropped, revised or replaced.

When evaluating the popularity of pictures, the invention keeps track of not just how often a picture was used, but also how often it was offered and in what position (e.g., first picture or seventeenth picture) it was offered. Thus, the measure of popularity takes into account the frequency and likelihood that the picture was seen.

An optional feature of the invention is to provide a mode of operation that, when enabled by a webmaster, uses picture popularity to automatically rearrange the order of presentation of the recommended pictures. This is done within each category. It can also rearrange the sequence in which the categories are presented, so that popular categories are seen first.

Another optional feature of the invention is to provide a mode of operation that, when enabled by a webmaster, rotates the first picture presented to the user. This is the picture that is behind the puzzle the first time the puzzle is constructed. Thus, it will be seen even if the user never browses or searches for pictures. This will gather better statistics on which images are the most popular and work best at converting free puzzles to sales.

Other Embodiments of the Invention

A more compact way to provide the question and answer input fields is as part of a memo component. Such a component functions like a word processor. The prepared questions are provided one per line and followed by a separating character such as a question mark, a long dash or a tab. The user is instructed that each question and answer pair are to take up exactly one line, and that unanswered questions will not be used. Long lines do not wrap to the next line but rather a horizontal scroll bar appears to provide as much virtual room as necessary. The user then appends an answer to each line he or she wants to use and adds additional questions and answers in the same format. It is possible but not necessary for the user to delete lines and it is also possible for the user to alter the questions.

An intermediate type of questionnaire would have each question and answer pair share a single input field. The question and answer would be separated with a separating character as described above. For either type of alternate questionnaire in which questions and answers share an input field, the computer parses out the answer according to some predetermined rule. The preferred rule is that a separating character separates the question and answer. Another parsing rule could be that the last (or first) complete word is the answer. For this to work, it helps if the parsing can be completed in real time and updated with each keystroke, so that the answer word is displayed in a different color of text or background. If the last character on a line is a space, then there is no last word. This is how it prevents the last word of the question from being interpreted as an answer word.

Another parsing rule requires that the questions appear as protected text that the user can not modify. Preferably, this protected text would be indicated in a different color. This is a possible way the invention may be provided but it is not the preferred way.

A more compact way to provide the question and answer input fields is as part of a spreadsheet-like component with the questions in one column and the answers corresponding row by row in another column. This is another possible way the invention may be provided but it is not the preferred way.

The preview page is optional to the invention. The preferred embodiment of the invention also provides for immediately loading a document file that contains both the puzzle and solution on separate pages of the same document. Another way is to cause a web browser or software program to launch one or two separate windows for the puzzle and solution. Showing the puzzle immediately has the advantage of making it easier for the user to refine the puzzle in an iterative process. Another preferred embodiment combines these features by providing a preview page that when scrolled down a little contains a copy of the questionnaire with the user's input preloaded and a "finished" button. Thus, the questionnaire is always available for fine tuning the puzzle and the puzzle and solution are visible in separate windows.

After the puzzle grid has been created in the computer's memory, the computer can optionally save this representation to a file and make it available to the user, with or without formatting information in it. Some users may prefer direct access to the constructed puzzle grid and solution and do the formatting by hand.

Another way the look and feel of the invention can be customized is by template. According to this method, the referring website provides a template HTML file into which the questionnaire is inserted at a certain point defined by a certain comment, like this: "<!--Insert questionnaire here-->". (Even greater flexibility could be provided by separately specifying every control on the questionnaire.) The referring website provides the uniform resource locator (URL) of the template file somewhere, such as in the webmaster's configuration area or as a parameter or query in the referring link. If that URL reference is new, the invention fetches it the first time it is used (likely during testing) and caches it. So long as the URL including filename remains the same the file is not checked to see if it has changed, as this would introduce a delay. The way to update the template file is to change its name and change the URL to point to the new name. Thus, for this method it is recommended that template files have a revision number as part of the file name. The look and feel of the results page and other pages is established in a like manner. The stock themes are also established by providing a template file for each theme. For stock themes, the file names should be descriptive so they can be presented in a selection list. The version numbers should also be in the filename, after a marker such as two underscore characters in a row. That way, the version number can be parsed out and not displayed in the selection list. This method of customizing the look and feel of the invention is less preferred. It adds complexity and work for the webmaster, and would likely be unpopular. However, this method may be provided in addition to the preferred method taught herein.

Another way to provide the invention is to provide it as a web service, preferably on a port other than the normal HTTP port. The web server of the referring website then acts as a middleman. It conveys the user's completed questionnaire to the web server of the invention and conveys the resulting puzzle and solution back to the users. This latter way involves extra steps and delays but it does have some significant advantages that some webmasters might like. For example, the invention would appear to exist on the referring website and the user would always remain on the referring website. The webmaster would want to convert the emails that are sent to refer to his website as well.

A variation of the web service would provide raw puzzles, formatted or not, instead of web pages. Then the referring website can take full responsibility for the questionnaire, its content and look and feel, as well as the preview page. The communication between the referring web server and the web server of the invention would merely be about the raw puzzle. The puzzle formatting could be done either by the web server of the invention or with greater flexibility by the referring web site.

Still another way of providing the invention is to provide a program that accepts a POST (or GET) action from a form on any other website. This form could be a static HTML page or a dynamic page, generated by the affiliate webmaster's website. The invention processes the form and produces the puzzle documents, with or without the preview page in between. Thus, the invention can be provided by two or more computers or web servers acting as one system to implement the features of the invention.

While a preferred embodiment of the invention has been described and illustrated above, other variations may be made utilizing the inventive concepts herein disclosed.

The foregoing describes only some embodiments of the invention, and modifications can be made without departing from the scope of the invention as defined in the following claims.

We claim:

1. A method of preparing an electronic word puzzle document on a computer system, said method comprising the steps of:
   (a) said computer system providing a prepared questionnaire, said questionnaire comprising a plurality of questions fields and a plurality of editable answer fields corresponding to said plurality of question fields, at least a plurality of said plurality of question fields being preloaded with questions;
   (b) said computer system inputting a plurality of answers, said plurality of answers answering at least some of the questions in said plurality of question fields;
   (c) said computer system constructing a word puzzle using said plurality of answers and the questions that correspond with said plurality of answers;
   (d) said computer system formatting said word puzzle into an electronic word puzzle document.

2. The method of step 1 wherein said questions are related to a preselected theme.

3. The method of step 1 wherein said word puzzle is a freeform crossword puzzle.

4. The method of step 1 wherein said word puzzle is a word search puzzle.

5. The method of step 1 wherein said plurality of questions fields are editable fields and wherein said step of said computer constructing a word puzzle uses the questions as edited.

6. The method of step 1 additionally comprising the step of said computer providing a background image behind said word puzzle on said word puzzle document.

7. The method of step 6 additionally comprising the steps of said computer presenting a choice of themed background images, said themed background images pertaining to a preselected topic, and said computer inputting a selection of one of said themed background images, and said computer using the selected image on said word puzzle document.

8. The method of step 6 wherein said word puzzle is a crossword puzzle and said background image is faded sufficient to make the clues legible.

9. The method of step 6 wherein said word puzzle is a crossword puzzle and said background image does not show in the used cells of the grid of said crossword puzzle.

10. The method of step 6 wherein said word puzzle is a crossword puzzle and wherein in the used cells of the grid of said crossword puzzle, said background image is sufficiently visible to provide continuity to the image and is simultaneously sufficiently faded to enable said used cells to legibly receive hand-written indicia.

11. The method of step 1 wherein said computer is a web server connected to a global computer network and wherein said prepared questionnaire is provided to a web browser via said global computer network.

12. The method of step 11 additionally comprising the steps of said computer accepting a web request, said web request indicating said web request was referred from a particular website; responsive to said web request, said computer searching for a webmaster configuration associated with said particular website and upon finding said webmaster configuration, providing said prepared questionnaire as customized by said webmaster configuration.

13. The method of step 11 additionally comprising the steps of said computer accepting a web request, said web request including a plurality of questions, responsive to said web request and said plurality of questions, said computer providing said plurality of questions as said prepared questionnaire.

14. A method in which a web site and a web server both on a globally accessible computer network provide the service of constructing a custom word puzzle document for a user using client software on a computer that is also on the network, said method comprising the steps of:
   (a) said web site providing a hyperlink to a questionnaire on said web server, said hyperlink identifying a prepared configuration stored on said web server;
   (b) said prepared configuration on said web server including a plurality of prepared questions relating to a theme;
   (c) said web server, responsive to said hyperlink, finding said prepared configuration and providing a questionnaire to said client software, said questionnaire comprising a plurality of questions fields and a plurality of editable answer fields corresponding to said plurality of question fields, and said plurality of question fields preloaded with said plurality of prepared questions of said prepared configuration;
   (d) said web server receiving a response to said questionnaire, said response including a plurality of answers, said plurality of answers answering at least some of the questions in said plurality of question fields;
   (e) responsive to said receiving a response, said web server constructing a word puzzle using said plurality of answers and the questions that correspond with said plurality of answers and said web server formatting said word puzzle into an electronic word puzzle document in said web server's memory;
   (f) said web server writing said electronic word puzzle document to a standard electronic document file and transmitting said standard electronic document file to said client software.

15. The method of claim 14 wherein said prepared configuration additionally comprises a plurality of images also related to said theme, and said method additionally comprising the steps of:
   (a) said web server presenting a choice to said user via said client software, said choice comprising a plurality of thumbnails of said plurality of images,
   (b) said web server receiving a user selection of one of said thumbnails from said client software;
   (c) said web server finding the image that corresponds to the user selected thumbnail; and
   (d) prior to said step of transmitting, said web server also writing said image that was found to said standard electronic document file.

* * * * *